(12) United States Patent
Liu et al.

(10) Patent No.: US 6,341,833 B1
(45) Date of Patent: Jan. 29, 2002

(54) PRINT CONTROL APPARATUS, PRINTING APPARATUS, PRINT CONTROL METHOD, PRINTING METHOD, RECORDING MEDIUM, AND METHOD FOR SETTING UP COLOR CONVERSION TABLE

(75) Inventors: Sa Liu, Beijing (CN); Yuko Yamamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/654,707

(22) Filed: Sep. 1, 2000

(30) Foreign Application Priority Data

Sep. 2, 1999 (JP) .......................................... 11-248459
Jul. 17, 2000 (JP) .......................................... 12-215583

(51) Int. Cl.[7] .................................................. B41J 29/38
(52) U.S. Cl. .................................................... 347/15
(58) Field of Search ........................... 347/15, 43, 19; 358/1.1, 298

(56) References Cited

U.S. PATENT DOCUMENTS 5,402,245 A * 3/1995 Motta et al. ............... 358/298

FOREIGN PATENT DOCUMENTS

| JP | 1-208142 | 8/1989 |
|---|---|---|
| JP | 7-214892 | 8/1995 |
| JP | 10-217603 | 8/1998 |
| JP | 11-5359 | 1/1999 |

* cited by examiner

Primary Examiner—Thinh Nguyen
(74) Attorney, Agent, or Firm—Oblon, Spivak, McClelland, Maier & Neustadt, P.C.

(57) ABSTRACT

First, image data are converted to first tone data for primary color inks, and then converted to second tone data for primary color and black inks, by under color elimination. The combinations of the above tone data for primary color and black inks, in which bronzing occurs when images are printed on the printing medium, are recorded beforehand as the conditions under which bronzing occurs. The determination of whether or not the conditions under which bronzing occurs are present in the above second tone data is made according to these conditions under which bronzing occurs. If bronzing will occur, a part of the under color elimination is converted to primary color inks. In this way, it becomes possible to print images in which bronzing does not occur. This process may also be executed by using color conversion tables.

16 Claims, 15 Drawing Sheets

|  |  | C | M | Y | K |
|---|---|---|---|---|---|
| Dye | Direct Blue 199 | 3.6 | | | |
|  | Acid Red 289 | | 2.8 | | |
|  | Direct Yellow 86 | | | 2.7 | |
|  | Hood Black 2 | | | | 4.8 |
| Diethylene Glycol | | 30 | 20 | 30 | 25 |
| Surfenol 465 | | 1 | 1 | 1 | 1 |
| Water | | 65.4 | 76.2 | 66.3 | 69.2 |
| Viscosity (mPa·s) | | 3.0 | 3.0 | 3.0 | 3.0 |

(Weight percents)

|  |  | C | M | Y | K |
|---|---|---|---|---|---|
| Pigments | Pigment Blue 15:3 | 3.0 | | | |
|  | Pigment Red 122 | | 3.0 | | |
|  | Pigment Yellow 74 | | | 3.0 | |
|  | Carbon Black | | | | 3.0 |
| Glycerine | | 10 | 10 | 10 | 10 |
| Surfenol 465 | | 1 | 1 | 1 | 1 |
| Water | | 79.0 | 79.0 | 79.0 | 79.0 |
| Ethers | | 7.0 | 7.0 | 7.0 | 7.0 |
| Viscosity (mPa·s) | | 3.0 | 3.0 | 3.0 | 3.0 |

(Weight percents)

|  | Printing paper 1 | Printing paper 2 | Printing paper 3 |
|---|---|---|---|
| Ink type 1 | A | B | B |
| Ink type 2 | A | B | C |
| Ink type 3 | D | A | C |

PRINT CONTROL APPARATUS, PRINTING APPARATUS, PRINT CONTROL METHOD, PRINTING METHOD, RECORDING MEDIUM, AND METHOD FOR SETTING UP COLOR CONVERSION TABLE

BACKGROUND OF THE INVENTION

1. Field of the Invention

The present invention relates to technology for image printing on printing media by jetting ink drops of each color ink, and more particularly to technology for the printing of high-quality images in which bronzing does not occur.

2. Description of the Related Art

Ink jet printers are widely used as image output devices for machines such as computers. Ink jet printers print color images by forming ink dots in colors such as cyan, magenta, yellow, and black on printing media.

Since ink jet printers form images by jetting ink drops of each color on printing media, when the forming density of the ink dots is high, the jetted ink drops mix on printing media, or the printing paper is caused to swell and crease. In other words, printing paper has a so-called tolerance value for ink, which is the limit beyond which ink dots cannot be formed at higher densities. Thus, various kinds of specialized printing papers are offered which raise the tolerance value of the ink, thereby reducing the likelihood of the occurrence of these problems. By using printing paper specialized for ink jet printers, it is possible to print high-quality images without paper cockling or ink feathering. In addition to these specialized printing papers, specialized papers with even higher performance are offered, such as printing paper on which the surface of the printed image has a gloss finish similar to that of photographs, or printing paper with weatherability on which the printed image does not fade easily.

SUMMARY OF THE INVENTION

However, printing images through the use of specialized paper has the problem of worsening of image quality by the occurrence of a phenomenon called "bronzing." Bronzing here refers to a phenomenon in which the quality of the light reflected by the surface of the printing paper changes according to the dye of jetted ink drops condensing on the surface of the printing paper, or according to the print surface having a bronze hue depending on the viewing angle due to the distribution of pigment granularity remaining on the print surface because of the difference in the pigment granularity characteristics of each ink. Techniques have been developed which offer printing paper on which bronzing does not occur easily (see Japanese Patent Laid-open No. 7-214892 or Japanese Patent Laid-open No. 10-217603, among others). Nevertheless, even by using such specialized paper, it is not possible to print high-quality images using the existing wide varieties of printing paper and still avoid bronzing.

The present invention aims to solve the above-mentioned problems found in the conventional art, and it is an object of the present invention to provide a technique for printing high-quality Images without bronzing by using the existing wide variety of printing papers.

BRIEF DESCRIPTION OF THE FIGURES

FIG. 5 is an Explanatory figure of the ink compositions, which can be used in the color printer.

DESCRIPTION OF THE PREFERRED EMBODIMENTS

Figure 1:
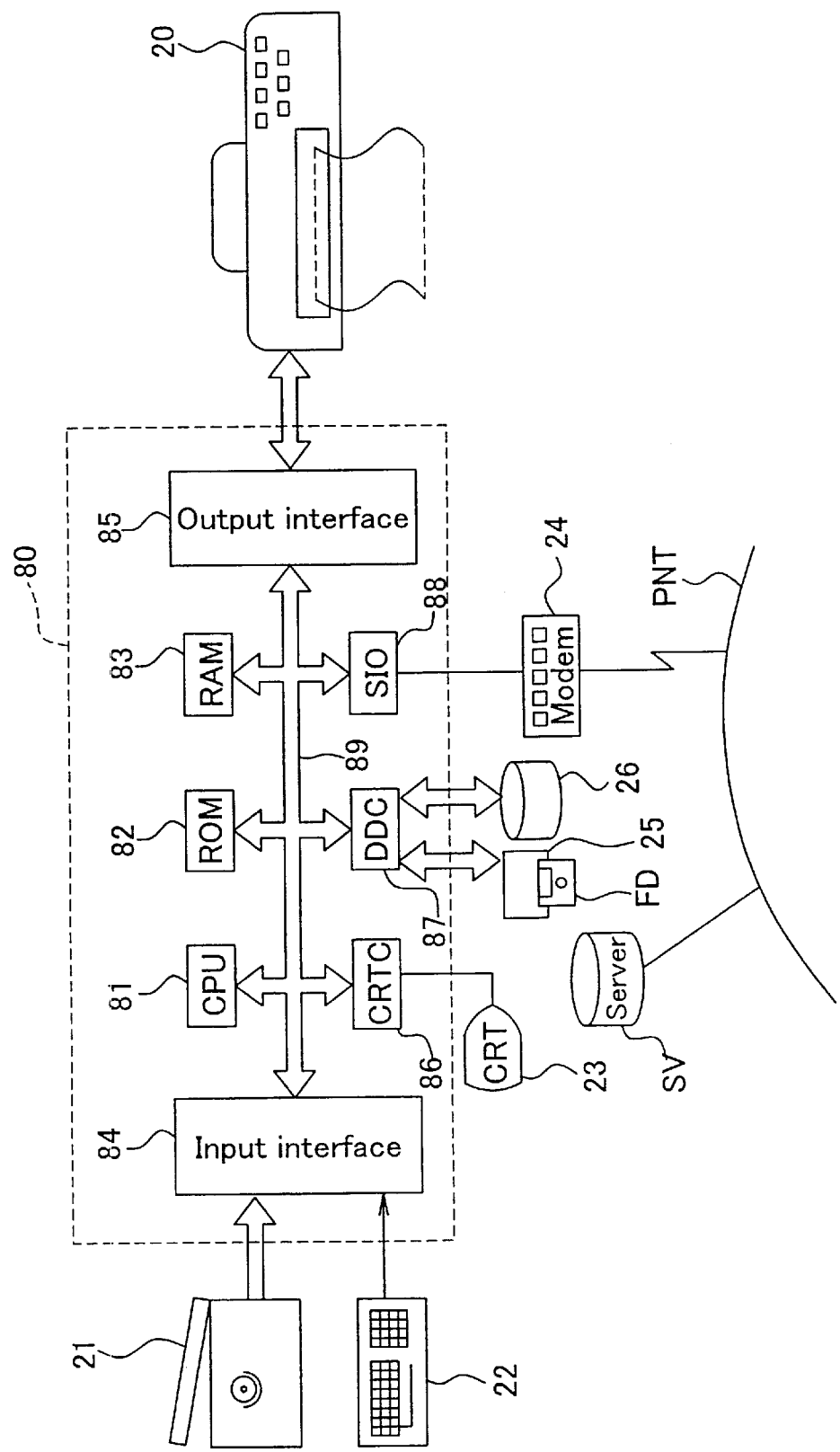
FIG. 1 is a Schematic figure of a preferred embodiment of the printing apparatus.

In order to solve at least some of the above-mentioned problems, the print control apparatus of the present invention employs the following constitution. A print control apparatus for controlling a printing portion by means of sending control information for controlling the formation of dots of appropriate colors by said printing portion, by which a color image corresponding to image data is printed by combining black ink dots and ink dots of a plurality of primary colors capable in combination of producing achromatic color, said print control apparatus comprising:

a color conversion table storage memory which stores a color conversion table matching the colors of the color image and the combination of each color tone value to form the above hues by using said primary color inks and black ink;

an image data conversion unit which converts said image data to tone data of said primary color inks and black ink, by referring to said stored color conversion table;

a dot formation unit which determines dot formation/non-formation by said primary color inks and black ink, based on said converted tone data; and a control information output unit which sends judgment results of said dot formation/non-formation as said control information for said printing portion;

wherein said color conversion table is a table matching combinations of color tone data of the above primary color inks and said black ink in the case of color shades whose total density of formed dots of each color on said printing media exceeds the defined density when expressed only by using said primary color inks, which combinations of color tone data have been confirmed to be unlikely to cause bronzing during ink dot formation of each color based on each of the above color tone data.

The print control method of the present invention is a print control method for controlling a printing portion by sending control information for controlling the formation of dots of appropriate colors by said printing portion, by which a color image corresponding to image data is printed by combining black ink dots and ink dots in a plurality of primary colors capable of producing achromatic color by a combination, said print control method comprising the steps of:

converting said image data into tone data for said primary color inks and black ink, by referring to color conversion tables matching the color shades of color image and the combination of each color tone value for expressing this color by said primary color inks and black ink;

determining dot formation/non-formation in said primary color inks and black ink; and sending said dot formation/non-formation judgment results to said printing portion as said control information, wherein said color conversion table is a stored table matching combinations of color tone data of said primary color inks and said black ink in case of color shades whose total density of formed dots of each color on said printing media exceeds the defined density when expressed only by using said primary color inks, these combinations of color tone data having been confirmed to be unlikely to cause bronzing during ink dot formation of each color based on each said color tone value.

When converting image data into the above tone data, the above-mentioned print control apparatus and print control method effect conversions by referring to the above color conversion table. The color conversion table here is a number chart in which corresponding tone data between the above primary color inks and black ink for each defined multiple color shades are recorded. The above-mentioned print control apparatus and print control method judge formation/non-formation of dots in the above primary color inks and black ink based on the tone data acquired in this way, and send the judgment results to the printing portion as the above controlling information. By doing so, it is possible for the reasons presented below to print high-quality images without the occurrence of bronzing.

Figure 17:
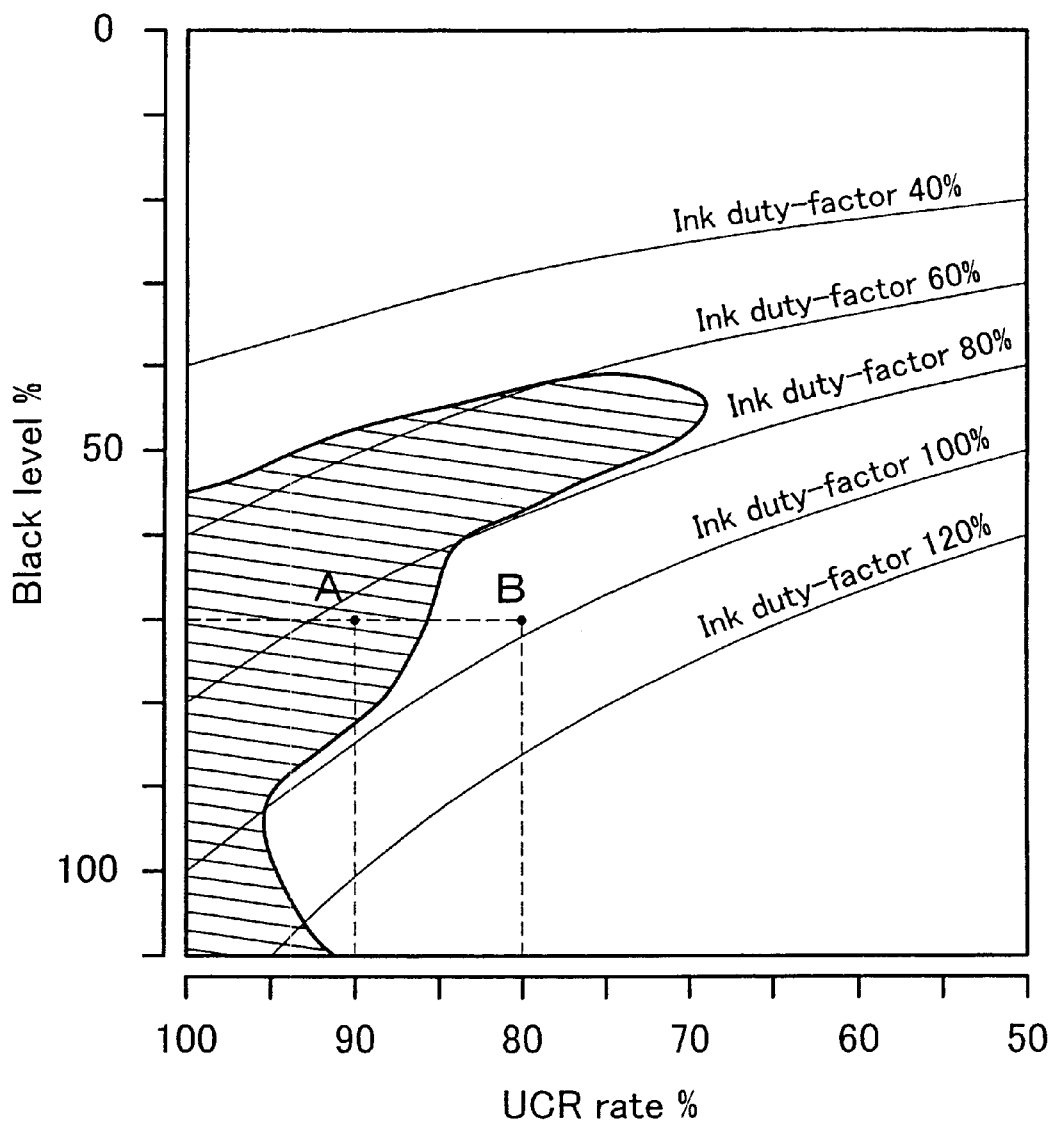
FIG. 17 an Explanatory figure showing the principle which permits the printing of high-quality images without bronzing in this invention.

FIG. 17 is an explanatory figure showing the conditions under which bronzing occurs, and the present invention was completed by discovering the correlation indicated in FIG. 17. Although the exact conditions for the occurrence of bronzing vary somewhat depending on the type of ink and type of printing media used, as well as on the hue of the image to be printed, the following explanation is based on the bronzing conditions described in FIG. 17 to represent the conditions under which bronzing occurs. The following is a discussion of FIG. 17.

FIG. 17 shows the conditions under which bronzing occurs by assigning black color levels and UCR rates to the vertical and horizontal axes, respectively. Black color is an index corresponding to the brightness of the printed image.

As the black color level value decreases, the brightness of the image increases. For example, an image in which only black ink dots are formed in every picture element is an image with 100% black color level. Similarly, an image in which only black ink dots are formed in half of the picture elements is an image with 50% black color level. Also, 110% black color level indicates a state in which black ink dots are formed superimposed on 10% of the picture elements on top of black ink dots formed in every picture element.

Also, the printing portion controlled by the print control apparatus in the present invention comprises a plurality of primary color inks which are capable of expressing achromatic color by using the combination thereof. Therefore, when printing an image of a certain black color level, it is possible to print the image not only with black ink, but also by combining the primary color dots. The UCR rate assigned to the horizontal axis in FIG. 17 is an index showing the rate of black ink dots used when printing an image of black color level. For example, a UCR rate of 100% indicates a state in which an image is printed by using only black ink dots. Also, a UCR rate of 50% indicates a state in which half of the dots of black ink dots under 100% UCR state are replaced by a combination of dots of primary color inks.

The area with hatching in FIG. 17 is the area where bronzing occurs. What is labeled as "ink duty-factor" in the figure is an index corresponding to the ink dot formation density. As the value of the ink duty-factor increases, so too does the ink dot formation density. For example, 100% ink duty-factor indicates a state in which dots are formed in every picture element, and 120% ink duty-factor indicates a state in which dots are formed over-layered in 20% of the picture element on top of dots formed in every picture element.

Here, an image printed under a printing condition A as shown in FIG. 17, that is, under the condition of a 70% black color level and 90% UCR rate, as an example. Since a printing condition A are within the hatched area, bronzing occurs in images printed under this condition. However, it is possible to avoid bronzing by keeping the black color level but changing the UCR rate from 90% to 80%, since printing is done under another printing condition B, which is outside the area with hatching. Reducing the UCR rate while maintaining the black color level is done by changing a part of black ink dots to a combination of dots of primary color inks. In this case, reducing the UCR rate while maintaining the black color level is corresponding to changing a part of black ink dots to an equivalent combination of dots of primary color inks. Thus, by changing the printing condition A to the printing conditions B, it is possible to print a high-quality image in which bronzing is less likely to occur while maintaining hue and brightness.

The above explanation presupposes varying the printing condition A, in which bronzing occurs, to the printing condition B, in which bronzing does not occur. However, it is possible to first check the printing conditions under which bronzing occurs, and to set the color conversion table based on the results thereof. That is, each color tone value confirmed to have less likelihood of bronzing occurrence when dots are formed based on each color tone value of primary colors and black is set in the appropriate color conversion table for each hue in which black ink dots are formed in addition to dots of primary color inks; in other words, each hue whose total density of dots in each color formed on printing media when printing only using primary color inks is superior to a predetermined ink tolerance density. By converting image data by referring to the color conversion table thus set, it becomes possible to print high-quality images in which bronzing is unlikely to occur. Note that converting image data referring to a color conversion table is preferable because it is possible to quickly print images without bronzing occurrence, since the time required for image data conversion can be reduced.

Each printing paper, of course, has the defined ink tolerance value, and when the tolerance value is exceeded, printed image quality degrades because of ink feathering or printing paper swelling. As described above, the ink duty-factor increases if printing conditions are varied toward decreasing the UCR rate. However, as indicated in the example shown in FIG. 17, it is usually possible to avoid bronzing by reducing the UCR rate without exceeding the ink tolerance value. Specialized paper, on which bronzing is especially likely to occur, has a high ink tolerance value. Therefore, decreasing the UCR rate to avoid bronzing does not lead so far as to the ink tolerance value.

As explained above, in the print control apparatus and print control method of the present invention, image data is converted to tone data in which the occurrence of bronzing is confirmed to be unlikely, and controlling information of dots of each color ink generated based on this tone data is sent to the above-mentioned printing portion. Thus, the printing portion can generate a high-quality image without bronzing.

By the same token, in the print control apparatus and print control method of the present invention, image data is first converted to tone data in which the occurrence of bronzing is confirmed to be unlikely, and a color image is printed by forming ink dots of primary color inks and black ink, based on the controlling information of dots for each color ink generated based on this tone data. As a result, the print control apparatus and print control method of the present invention are suitable because a good image is produced in which bronzing is unlikely to occur.

In the above-mentioned print control apparatus, it is possible to store a plurality of color conversion table sets by distinguishing the types of above primary color inks and black ink beforehand, then to select a color conversion table based on the information about the types of the above primary color inks and black ink used for dot formation by the above-mentioned printing portion, and then to convert the above image data by referring to the selected color conversion table.

Another option is to store a plurality of color conversion table sets by distinguishing the types of printing media on which dots are formed, to select a color conversion table based on the information about the types of printing media on which dots are formed by the above-mentioned printing portion, and then to convert the above image data by referring to the selected color conversion table.

Yet another option is to store a plurality of color conversion table sets by distinguishing types of the above primary color inks and black ink, and the types of printing media on which dots are formed, to select a color conversion table based on the information about the types of ink used for dot formation and the types of printing media on which dots are formed by the above-mentioned printing portion, and then to convert the above image data by referring to the selected color conversion table.

The conditions under which bronzing occurs may vary slightly depending on the type of printing ink used. Ink attributes are especially different between so-called dye-type inks and pigment color inks, and the conditions under which bronzing occurs are also different. Moreover, bronzing conditions may vary slightly depending on the type of printing media on which ink dots are formed. Therefore, by selecting a color conversion table corresponding to the type of ink used for dot formation or the type of printing media, and by converting image data referring to the color conversion table thus selected, it is possible to convert color image precisely in accordance with the type of ink and type of printing media. As a result, the above-mentioned print control apparatus is suitable because allows the printing of high-quality images in which bronzing is unlikely to occur. It of course becomes possible to print even better images by converting image data by referring to a color conversion table which takes into consideration both the ink type and the printing media type. Moreover, it is acceptable to convert image data by using a color conversion table selected externally depending on the ink type and printing media type from the stored color conversion tables.

Such a print control apparatus can be arranged to send controlling information for dots of each color ink of cyan, magenta, and yellow as controlling information for controlling the formation of ink dots in primary color inks. Moreover, the print control apparatus can be arranged to send controlling information about color dots of each color ink of light cyan with lower intensity than the above cyan, or light magenta with lower intensity than the above magenta.

The achromatic color can be expressed by combining each ink in cyan, magenta, and yellow, or by combining each ink with the addition of light cyan and light magenta inks to these. Therefore, even when bronzing occurs, it is possible to avoid bronzing by replacing a part of the black ink with cyan, magenta, and yellow ink, or by replacing part of the black ink with light cyan, light magenta, and yellow. Therefore, by first setting the above color conversion table within the range of the combinations of tone data in which the occurrence of bronzing is confirmed to be unlikely, and then converting the image data by referring to this color conversion table, the above print control apparatus is suitable because it permits the printing of high-quality images without bronzing.

The above-mentioned print control apparatus may be embodied in following manner. That is:

A print control apparatus for controlling a printing portion by sending control information for controlling the formation of dots of appropriate colors by said printing portion, by which the color image corresponding to the image data is printed by combining black ink dots and ink dots in a plurality of primary colors capable of producing achromatic color by their combination, said print control apparatus comprising:

a first image data conversion unit which converts said image data into the first tone data which is tone data about each of said primary color inks;

a second image data conversion unit which converts said first tone data into the second tone data, which is tone data for said primary color inks and black ink, by converting at least a part of the achromatic color expressed in said first tone data, so that the total said primary color ink dot density formed on said printing media does not exceed the defined density when converting the above first tone data into expression format by formation/non-formation of said primary color inks;

a bronzing occurrence condition storage memory which stores bronzing occurrence conditions, which are a combination of tone data for said primary color inks and black ink, in which bronzing occurs during ink dot formation on said printing media;

an image data confirmation unit which confirms said second tone data as the third tone data in which bronzing is unlikely to occur, by replacing at least a part of the tone data for the black ink in said second tone data, in case it is determined, based on said stored bronzing occurrence conditions, that bronzing will occur when said primary color inks and black ink dots are formed based on said second tone data;

a dot formation unit which determines dot formation/non-formation of dots by said primary color inks and black ink based on the above confirmed third tone data; and a controlling information output unit which sends said judgment results to said printing portion as said controlling information.

In such a print control apparatus, after first converting input image data into the first tone data, the first tone data is converted to the second conversion data so that the total density of ink dots in each color formed on the printing media does not exceed the defined density. Such conversion is done by a part of the tone data of the primary color inks expressing the achromatic color in the first tone data into the black ink tone data. By using ink dots in black ink, the total density of ink dots not to exceed the defined density because the achromatic color can be expressed with fewer ink dots in black ink than ink dots in primary color inks. Upon determining whether or not bronzing occurs if the image is printed based on the second tone data thus obtained, by considering the pre-stored conditions under which bronzing occurrence, if bronzing is judged to occur, the second tone data is converted to the third tone data by converting a part of the black ink tone data to tone data of the primary color inks again. Based on the third tone data thus obtained, the formation or non-formation of dots of these primary color inks and black ink is determined, and this judgment result is output as the above controlling information.

If ink dots of the above primary color inks and black ink are formed based on the output controlling information in this way, it is possible to print high-quality images in which bronzing is unlikely to occur.

In such a print control apparatus, it is possible to store bronzing conditions by using two indices as follows. The first index corresponds to the tone data for black ink when the achromatic color in the image data is expressed only by using black ink. One example is an index corresponding to the black color level shown in the above-mentioned FIG. 17. The second index is an index corresponding to the tone data for black ink in which bronzing begins to occur when expressing the achromatic color indicated by the first index. One example is an index corresponding to the UCR rate indicated in FIG. 17. By storing these two indices, it is possible to store the level at which black ink dot formation bronzing occurs, depending on the brightness expressed in the image data.

It is necessary to store tone data corresponding to the type of the ink used in order to store bronzing occurrence conditions as tone data for primary color inks and black ink. However, the above print control apparatus is suitable because it is possible to store the tone data by using less storage space by storing the tone data using the two indices as described above.

In such a print control apparatus, a combination of tone data capable of expressing hues without causing bronzing can be set up, and upon converting the above image data, it is possible to have each process of the said unit for bronzing occurrence conditions storage and the said unit of image data confirmation actually done at the time as image data conversion by conversion with reference to this color conversion table. The above print control apparatus is suitable because it enables rapid printing of high-quality images in which bronzing is unlikely to occur if each of these processes are actually performed at time of image data conversion.

In addition to the versions explained above, other versions of the invention can be obtained. For example, if this invention is conceived by focusing on color conversion table settings, the invention can be conceived as the following color conversion table setting method.

That is, the above version is a method for setting up color conversion tables which are used when converting a color image into tone data for each color: black and the primary colors capable of expressing the achromatic color when combined, and in which the above color image hues and the above tone data for each color are matched and stored, said method comprising the steps of:

matching each color shade expressed in said image data and primary color tone data which is a combination of tone data of said primary colors to express said colors;

determining whether the total density of dots of each color formed on said printing media exceeds the defined density when expressing said color shade by forming dots in said primary colors based on said primary color tone data; and if said total density exceeds the defined density, converting at least a part of the tone value corresponding to the achromatic color in said basic tone data to said black tone value equaling the value, within the combination of tone data of said primary colors and black confirmed to be unlikely to cause bronzing in formation of each color dots on said printing media.

It is possible to print high-quality color images in which bronzing is unlikely to occur, by converting image data by referring to the color conversion table set by such a method.

Moreover, under this method of setting color conversion table, it is possible to determine the range of the above combinations of tone data of each color ink in which it is confirmed that bronzing is unlikely to occur as follows. The range in which bronzing is unlikely to occur by: the tone value of the black ink when the tone value corresponding to the achromatic color in the tone data of the primary colors is expressed only by the above black ink; and the tone value of the black ink at which bronzing starts to occur when this achromatic color area is replaced.

It is necessary to store tone data corresponding to the type of the ink used, in order to store the conditions under which bronzing occurs as tone data of primary color inks and black. However, the above version of conceiving of the current invention is suitable because it is possible to store the tone data by using less storage space by storing the tone data using the two indices as described above.

It is possible to execute the print control method of the current invention by executing the function for controlling the printing portion by using a computer. Therefore, the current invention may be conceived of as recording medium in which programs for executing these functions by using a computer is recorded in a format which computers can read. That is, this version of recording medium is a recording medium for recording a method for controlling the above printing portion by sending control information for controlling dot formation of the above colors by the printing portion, which prints the color image corresponding to the image data by combining black ink dots and ink dots in a plurality of primary colors whose combination is capable of producing achromatic color, in a format which computers can read, which stores programs for realizing:

a function for storing color conversion table matching color shades of color image and combinations of each color tone value for expressing said color shade in said primary color inks and black ink;

a function for converting said image data into tone data for said primary color inks and black ink, by referring to said stored color conversion tables;

a function for determining dot formation/non-formation in said primary color inks and black ink, based on said converted tone data; and a function for sending said dot formation/non-formation judgment results to said printing portion as said controlling information; and wherein said color conversion table of the recording medium is a table matching combinations of color tone data of said primary color inks and said black ink in case of color shades whose total density of formed dots of each color on said printing media exceeds the defined density when expressed only by using said primary color inks, these combinations of color tone data having been confirmed to be unlikely to cause bronzing during ink dot formation of each color based on each said color tone value.

It is possible to print high-quality color image in which bronzing is unlikely to occur, by having a computer read the programs recorded in these recording medium and execute various processes.

Other Embodiments of the Invention

Moreover, it is possible to actualize the current invention by storing program codes which realize the above-mentioned print control method on a computer, and by having the computer execute the processes described by these program codes. Therefore, the current invention may be conceived of as program codes as follows.

That is, the current invention is conceived of as program codes that describe programs for realizing controlling method for the above printing portion by sending control information for controlling dot formation of the above colors by the printing portion which prints the color image corresponding to the image data, by combining black ink dots and ink dots in a plurality of primary colors which in combination are capable of producing achromatic color, which describe program codes realizing:

a function for recording color conversion table matching the color image hues with the combination of tone value of each color for expressing these hues by using the above primary color inks and black;

a function for converting the above image data into the above tone data of the primary color inks and black, with reference to the above recorded color conversion table;

a function for judging formation/non-formation of dots of the above inks of primary colors and black, based on the above converted tone data; and a function for sending out the above judgment results of dot formation/non-formation as the above controlling information;

wherein the above recorded color conversion table is a table matching combinations of color tone data of the above primary color inks, with the black ink when color shades whose total density of formed dots of each color on said printing medium exceeds the defined density when these color shades are expressed only by using said primary color inks, it having been confirmed that for these combinations of color tone data bronzing is unlikely to occur during ink dot formation of each color based on each of the above color tone value.

BEST MODES OF CARRYING OUT THE INVENTION

In order to explain the effect of the current invention more clearly, preferred embodiments of the current invention are explained in the following order.

A. System configuration:
B. Summary of printing process
C. A method for avoiding the occurrence of bronzing:
   C-1. A method for surveying conditions under which bronzing occurs:
   C-2. The first example of avoiding bronzing:
   C-3. The second example of avoiding bronzing:

A. System Configuration

FIG. 1 is an explanatory figure showing the configuration of the printing system of the current invention including the print control apparatus. As the figure shows, this printing system is configured with a computer 80 as a print control apparatus and a color printer 20, which, when defined programs are loaded onto the computer and executed, functions as a printing system as a whole. Color images which will be printed are scanned in by using a color scanner 21 connected to a computer 80, or images that are created on the computer 80 by various application programs may be used. These image data ORG are converted to image data which can be printed by color printer 20, by a CPU 81 in the computer 80. Color printer 20 prints a color image which corresponds to the color original by forming ink dots of each color on printing medium, following this image data FNL.

The computer 80 is configured with a CPU 81, which executes various calculation processes, a RAM 83, which temporarily records data, a ROM 82, which records various programs, and a hard disk 26 and so on. Moreover, the computer 80 can download necessary data and programs from a server SV on an external network onto the hard disk 26, when a SIO 88 is connected to the public telephone line PNT via a modem 24.

The color printer 20 is a printer which can print color images. This embodiment uses an ink jet printer, which prints color images by forming dots of four colors in total: cyan; magenta; yellow; and black, on printing paper. It is certainly possible to use an ink jet printer which can form dots of six colors in total: light cyan dots, which is cyan with lower intensity: and light magenta dots, which is magenta with lower intensity; in addition to the dots of these four colors. The ink jet method of the ink jet printer used in this embodiment employs a method which uses piezo elements, as described below. It is also possible to use a printer with a nozzle unit which jets ink in other methods. This approach may, for example, be adapted to a printer which employs the method of ink jet by bubbles which are created in the ink path by applying an electric current to a heater placed in the ink path.

Figure 2:
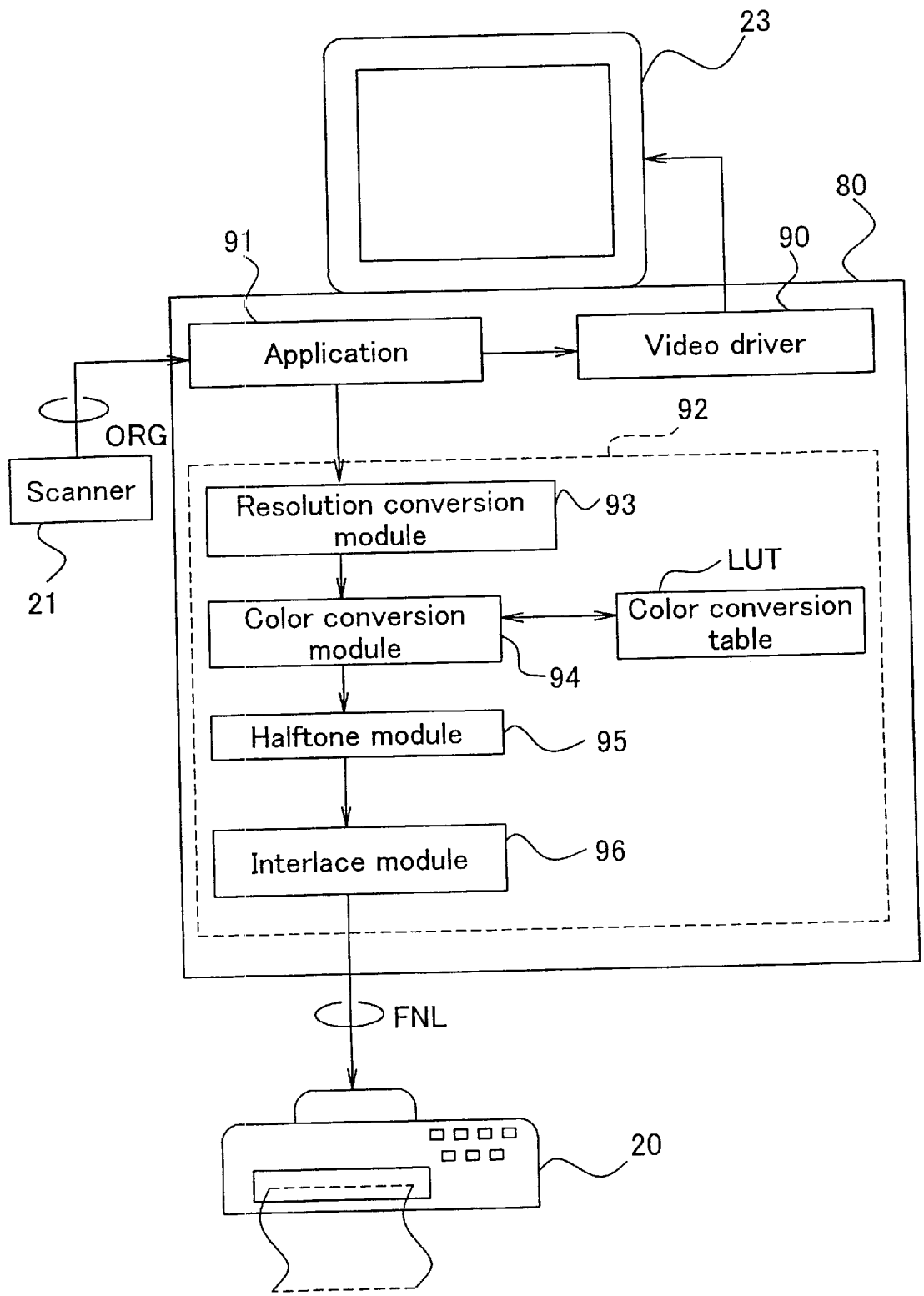
FIG. 2 is an Explanatory figure of the software configuration.

FIG. 2 is a block figure schematically showing the software configuration of this print control apparatus. On the computer 80, every application program 91 operates under an operating system. A video driver 90 and a printer driver 92 are installed in the operating system, and image data sent out by each application program 91 is sent out to the color printer 20 via these drivers.

When the application program 91 sends a print command, the printer driver 92 on the computer 80 receives image data from the application program 91, executes the defined imaging processes, and converts the image data to image data which can be printed by the printer. As is schematically shown in FIG. 2, imaging processes executed by the printer driver 92 are configured with 4 major modules: a resolution conversion module 93; a color conversion module 94; a half tone module 95; and an interlace module 96. The contents of imaging processes executed by each module will be described below. Image data received by the printer driver 92 is converted by these modules, and then sent out to the color printer 20 as the final image data FNL. Moreover, the color printer 20 in this embodiment only plays a role of forming dots according to the image data FNL, and does not execute imaging processes. However, it is possible to carry out a part of the image conversion on the color printer 20.

Figure 3:
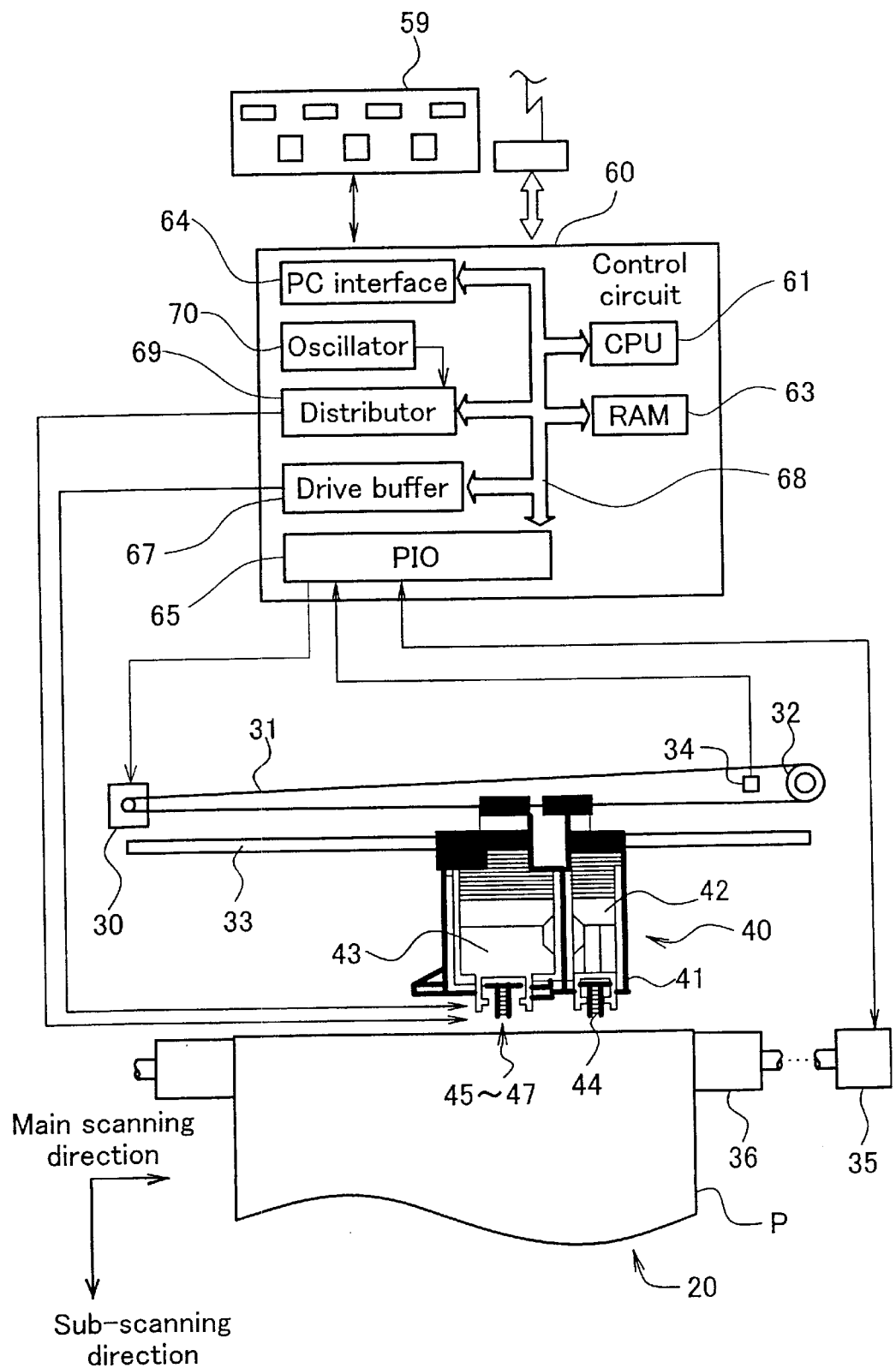
FIG. 3 is a Schematic figure of the preferred embodiment of the printer.

FIG. 3 shows the configuration summary of the color printer 20 in this embodiment. As is shown in the figure, this color printer 20 is configured with a mechanism which jets ink and forms dots by driving a printing head 41 installed in a carriage 40, a mechanism which oscillates this carriage 40 axial to the shaft of a platen 36 by a carriage motor 30, a mechanism which moves printing paper P by means of a paper drive motor 35, and a control circuit 60.

The mechanism which oscillates the carriage 40 in the axial direction relative to the platen 36 is configured with: a pulley 32, which tensions an endless drive belt 31 between a sliding shaft 33, which sustains the carriage 40, which is built parallel to the shaft of platen 36 capable of sliding; and a position detection censor 34, which detects the default position of the carriage 40 and so on.

The mechanism for moving the printing paper P is configured with: the platen 36; the paper drive motor 35; a paper feed roller, which is not shown in the figure; and a gear train (not shown), which transmits the rotational motion of the paper drive motor 35 to the platen 36 and the paper feed roller. The printing paper P is placed in such a way so that it is inserted between the platen 36 and the paper feed roller, and only a defined amount corresponding to the rotational angle of the platen 36 is sent.

A PC interface 64, which transfers data between the computer 80; a peripheral input/output component (PIO) 65, which transfers data between the paper drive motor 35; the carriage motor 30; a drive buffer 67, which supplies dot on/off signals to an ink jet head 44 or 47; a CPU 61, which controls them; a RAM 63, which temporarily records data; and so on, are built inside the control circuit 60. An oscillator 70, which sends out drive wave, and a distributor 69, which distributes the output from the oscillator 70 to the ink jet head 44 or 47 according to the defined timing, are also built inside the control circuit 60. Moreover, two more lines of ink jet heads are added in the color printer if it is capable of forming dots in total of six colors, light cyan and light magenta in addition to dots of four colors: cyan; magenta; yellow; and black.

As it sends drive signals to the carriage motor 30, the CPU 61 sends trigger signals to the oscillator 70, and synchronizing to them, the CPU 61 reads out the dot on/off signals stored on the RAM 63 and sends them out to the drive buffer 67. Thus, under the control of the CPU 61, ink drops are expelled from each of the nozzles provided to the nozzle unit while the carriage 40 is scanned horizontally. Moreover, the CPU 61 controls the motion of the paper drive motor 35, synchronizing to the motion of the carriage. Thus, ink dots are formed in the appropriate positions on the printing paper.

An ink cartridge 42, which stores black (K) ink, and an ink cartridge 43, which stores 3 color inks, cyan (C), magenta (M), and yellow (Y), are attached to the carriage 40. It is also possible to store the K ink and the plurality of color inks in the same ink cartridge. It is also possible to store each color ink in a separate cartridge. Allowing a plurality of inks to be stored in one cartridge makes it possible to configure the ink cartridge compactly.

Figures 4, 5A, 5B:
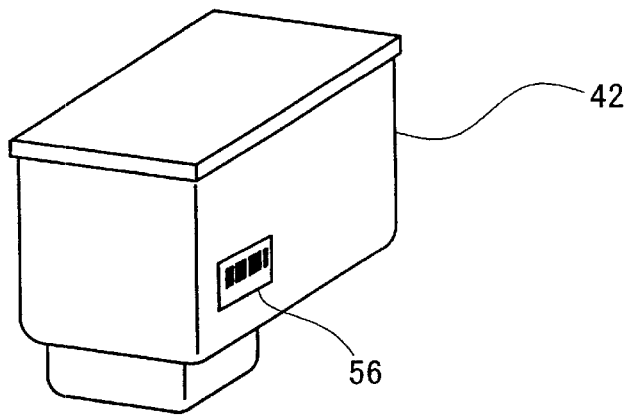
FIG. 4 is an External view of the ink cartridge of the color printer of the preferred embodiment.

FIG. 4 is an explanatory figure showing the visual shape of the ink cartridge 42. As is shown, an identification label 56 is pasted on the ink cartridge, on which the type of ink stored in the ink cartridge is written. As described below, in the printing apparatus of this embodiment, it is possible to print high-quality images in which so-called bronzing is unlikely to occur, according to the information on the type of ink and the printing paper. The type of ink is specified by the number written on the identification label 56.

FIG. 5 is an explanatory figure showing an example of compositions of ink stored in the ink cartridges 42, 43. FIG. 5(a) shows the composition of so-called dye-type ink, whose ink color is created by dye: and FIG. 5(b) shows the composition of the so-called pigment ink. As illustrated in FIG. 5, each ink is a mixed solution made up by adding the appropriate amount of each of the following to distilled water: dye or pigments for ink coloration; and an organic solvent used as a solvent for the dye or the pigments, as well as for adjusting the ink viscosity. Needless to say, various other ink compositions than the compositions shown in FIG. 5 can be employed. Moreover, light magenta and light cyan ink use a composition in which the dye concentration is lower than cyan ink or magenta ink.

When the ink cartridges 42, 43, which store these inks, are attached to the carriage 40, each ink inside the cartridges is supplied to the ink jet head 44 or 47 for each color respectively through a pipe which is not shown in the figure. The ink which is supplied to each head is jetted in the method explained below and forms dots on the printing paper.

Figure 6A:
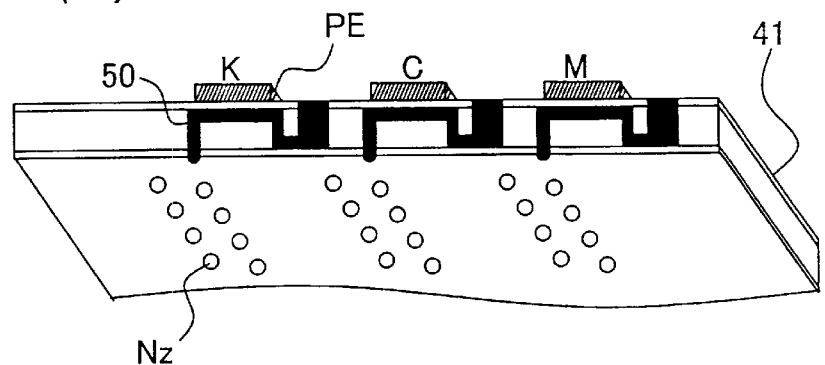
FIG. 6 is an Explanatory figure of the dot formation principle of the preferred embodiment of the printer.
Figure 6B:
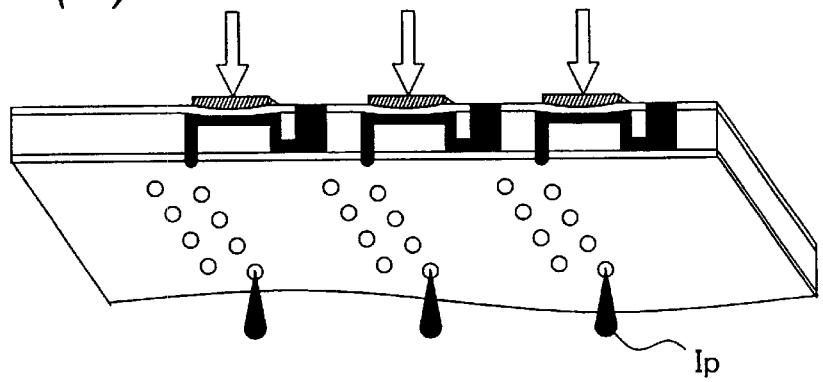

FIG. 6 (a) is an explanatory figure showing the internal structure of the ink head for each color. 48 nozzles Nz are set up for each color inside the ink jet head 44 or 47 specified for each color, and an ink path 50, and piezo elements PE along that path, are set up in each nozzle. The piezo elements PE are, as is well-known, elements whose crystal structure is distorted by application of voltage, and they render electricity—machine energy conversion at an extremely high speed. In this embodiment, by applying voltage for a defined time period between electrodes set up at each end of the piezo elements PE, the piezo elements PE expand during the time period of voltage application, and transform one side of the ink path 50. As a result, the volume of the ink path 50 flexes according to the expansion of the piezo elements PE, and the amount of ink corresponding to the amount of this erosion is jetted at a high speed as particles Ip from the nozzles Nz. As the printing paper P attached to the platen 36 absorb this ink Ip, dots are formed on the printing paper P. Moreover, it is possible to control the size of jetted ink drops by controlling the voltage wave applied to the piezo elements PE. If the size of jetted ink drops is controlled, the size of ink dots formed on the printing paper can be controlled.

Figure 7:
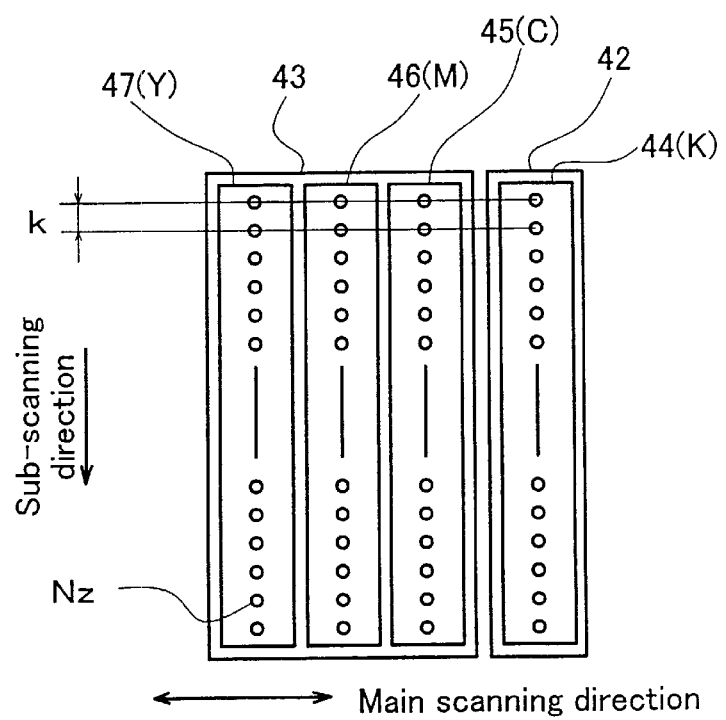
FIG. 7 is an Explanatory figure of the ink jet head nozzle arrangement of the preferred embodiment of the printer.

FIG. 7 is an explanatory figure showing the arrangement of the ink jet nozzles Nz in the ink jet head 44 or 47. As indicated, 4 sets of nozzle arrays which jet each color ink are configured on the bottom side of the ink jet head, and 48 nozzles Nz per set of nozzle arrays are arranged in a zigzag pattern at a fixed nozzle pitch k. Moreover, the 48 nozzles Nz do not need to be arranged in a zigzag pattern, but can be arranged on a straight line. However, a zigzag arrangement has the advantage of being able to decrease the value of the nozzle pitch k.

As is shown in FIG. 7, the ink jet head 44 or 47 for each color is staggered in the drive direction of the carriage 40. Moreover, the nozzles of each color head are also staggered in the drive direction of the carriage 40 because they are arranged in a zigzag pattern. The control circuit of the color printer 20 jets ink drops by driving the respective PE elements according to an appropriate timing, taking into account the differences in the positions of these nozzles as it drives the carriage 40.

The color printer 20, which has the above hardware configuration, moves the ink jet head 44 or 47 for each color in the main scanning direction in relation to the printing paper P by means of the driving carriage motor 30, and moves the printing paper P in the sub scanning direction by driving the paper driving motor 35. Under the control of the control circuit 60, the color printer 20 prints color images on printing paper by driving the nozzles according to the appropriate timing and jetting ink drops as it repeats the main scanning and sub scanning of the carriage 40.

B. Summary of Printing Process

Figure 8:
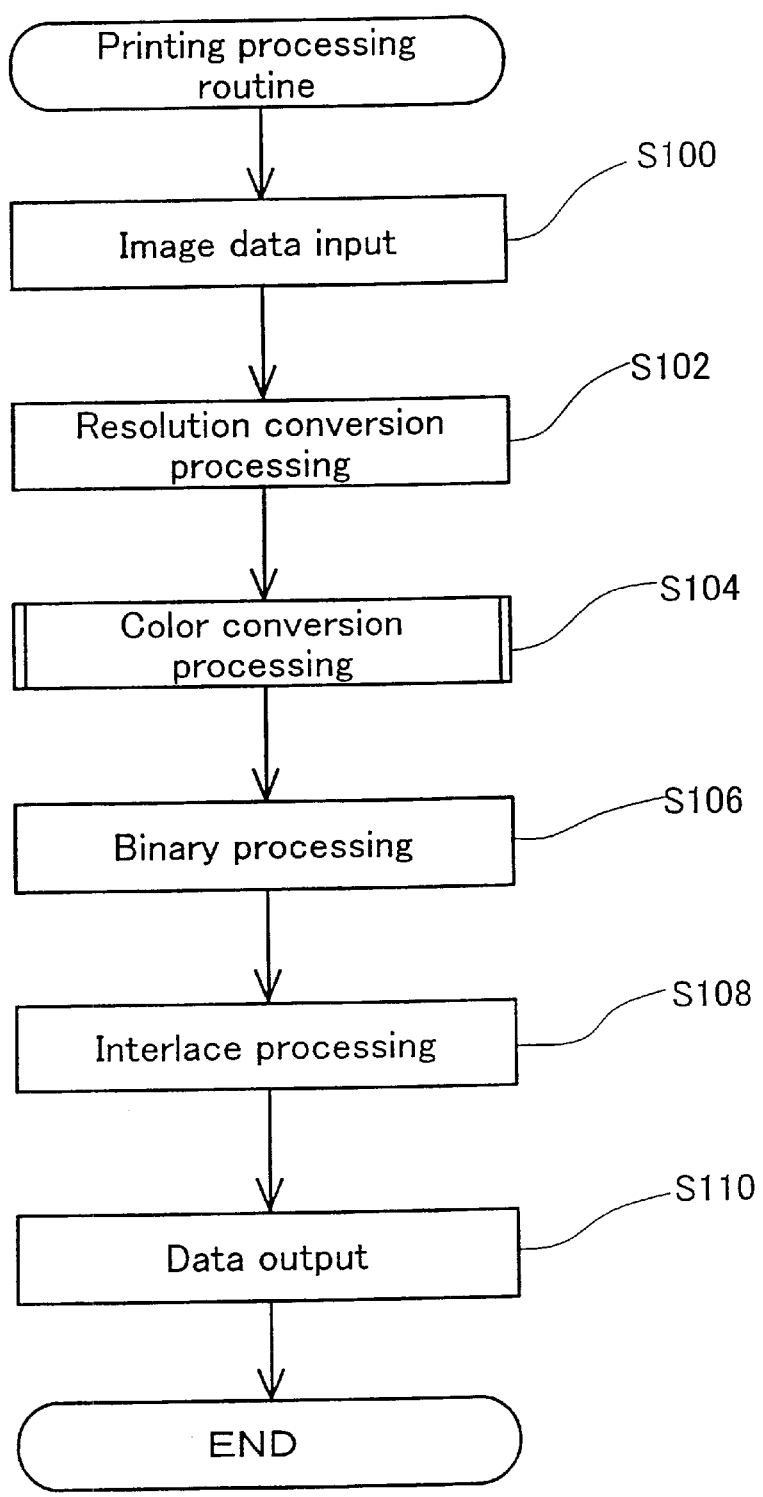
FIG. 8 is a Flowchart illustrating the printing processing routine flow in the preferred embodiment.

As is described above, the color printer 20 possesses the function of printing color images by receiving image data FNL. The image data FNL supplied to the color printer 20 is generated by the computer 80 executing defined imaging processes on the color image. FIG. 8 is a flow chart showing the summary of the process in which the computer 80 sends out the image data FNL to the color printer 20 and print the image. This process is carried out by using each function of the CPU 81, in the printer driver 92 of the computer 80. In the following, summary of printing process is explained following the figure.

As is shown in FIG. 8, the CPU 81 first inputs image data (Step S100) when printing process routine starts. This image data is supplied by the application program 91 as explained in FIG. 2, and possesses 256 color tone ranging from 0 to 255 for respective R-G-B color for each image element which makes up the image. The resolution of this image data changes according to the resolution of the original image data ORG.

After the image data input, the CPU 81 converts the resolution of the image data to the resolution for printing on the color printer 20 (step S102). When the resolution of the image data is lower than the printing resolution, a resolution conversion is done by generating new data between the adjacent original image data by linear interpolation. On the other hand, when the resolution of the image data is higher than the printing resolution, a resolution conversion is done by thinning the data at fixed ratio.

Next, the CPU 81 executes a color conversion process (Step S104). The color conversion process converts image data made up of R-G-B tone data to respective tone value data for C-M-Y-K, which is used by the color printer 20. This process is carried out by using a color conversion table LUT (cf. FIG. 2). Combinations of C-M-Y-K for expressing each color, which are made up of combinations of R-G-B respectively, are stored in the LUT. Moreover, if the color printer is capable of forming dots in light cyan (LC) and light magenta (LM), an LUT which stores the combinations of LC and LM in addition to C-M-Y-K is used. The color printer 20 in this embodiment avoids the occurrence of bronzing by appropriately executing color conversion process by adjusting to the combination of printing paper and ink. The details of color conversion process are described below.

Binary processing is executed when the color conversion process is finished. In this embodiment, the image data after color conversion is a 256 color tone image of 4 colors, C-M-Y-K, respectively. On the other hand, the color printer 20 in this embodiment can only choose between 2 choices: dot formation or non-formation. Therefore, it is necessary to convert the image composed of 256 color tone data to an image expressed by 2 color tone data which can be expressed by the color printer 20. This conversion is executed by binary processing.

When the binary processing is finished, the CPU 81 starts interlace processing (Step S108). This process rearranges the image data, which has been converted by the binary processing to the format which specifies dot formation/non-formation, in the order the image data is sent to the color printer 20. In other words, as mentioned above, the color printer 20 forms dot lines (raster) on the printing paper P by driving the printing head 41, repeating main scanning and sub scanning of the carriage 40. As explained using FIG. 7, the multiple nozzles Nz are built in the ink jet head 44 or 47 for each color, thus multiple lines of raster can be formed by one main scanning. These raster are spaced at the interval of the nozzle pitch k. Thus, it becomes necessary to have a kind of control which first forms multiple rasters which are spaced at the interval of the nozzle pitch k in one main scanning, then forms new raster among these raster. When such controlling is done, the order in which dots are formed by the color printer 20 is different from the order of picture element of the image data. Therefore, the image data is rearranged in interlace processing.

After the interlace processing, the image data is sent out to the color printer 20 as the image data FNL, which can be printed by the printer (step S110). The image is printed on printing paper by dot formation by the color printer 20.

C. A Method for Avoiding the Occurrence of Bronzing

The printing system of this embodiment prints high quality images in which bronzing does not occur either by surveying the conditions under which bronzing occurs beforehand and avoiding these conditions, or by setting the color conversion table to avoid these conditions. In the following, a method for surveying the conditions under which bronzing occurs is first explained, and then a method for printing high-quality image by avoiding these conditions is explained.

C-1. A Method for Surveying the Conditions Under Which Bronzing Occurs

Figure 9:
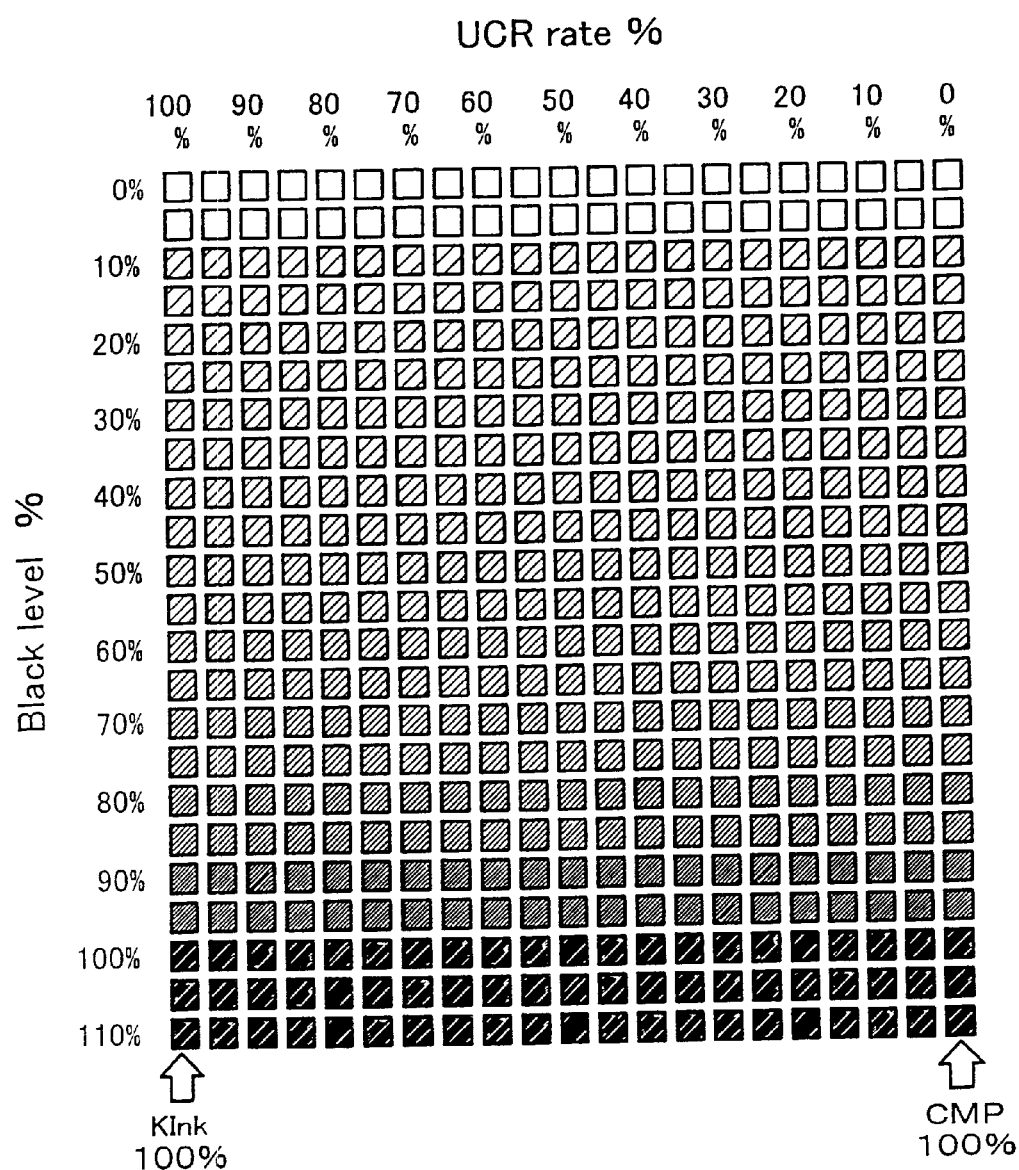
FIG. 9 is an Explanatory figure showing the patch image printed to survey the conditions under which bronzing occurs.

FIG. 9 is an explanatory figure showing a method for surveying conditions under which bronzing occurs in this embodiment. As is shown in the figure, in this embodiment, the conditions under which bronzing occurs are surveyed by means of printing a patch image group in which black level (lightness) and UCR rate of each patch image are changed. In the following, this is explained using FIG. 9.

Printing conditions are surveyed prior to printing the patch image group. The printing conditions here are 3 conditions related to bronzing: ink type, printing paper type, and hue. Ink type and printing paper type are surveyed first, because it is known that the likelihood of bronzing occurrence differs according to the combination of ink and printing paper. As for hues, it is mainly the achromatic color that is surveyed, but it is possible to survey cyan, magenta, and yellow as well.

After these conditions are determined, the above printing system prints a patch image group in which 21 small squares (a patch image) are arranged vertically and horizontally. Each patch image differs in the black level vertically, and in the UCR rate horizontally. The details of UCR rate is described below. Black level is an index as whose value increases, lightness decreases. When printing is done only by using a K ink, the black level value is the same as the dot recording ratio of the K dots. A dot ratio is the ratio with which dots are formed for picture elements. For example, 100% dot ratio means that dots are formed for every picture element, and 50% dot ratio means that dots are formed for half of the picture elements. Moreover, 110% dot ratio means that dots are formed on 10% of the picture elements, over the dots formed for every picture element.

As mentioned above, black can be expressed by printing either in K dots, or in combination of approximately same number of C dots, M dots, and Y dots. The black printed by using C dots, M dots, and Y dots is called composite K, to distinguish it from the black printed in K dots. This means that it is possible to print patch images with same black level by only using K dots, or by using composite K. Cases where only K dots are used in printing are defined as 100% UCR rate, and cases where only C-M-Y dots are used are defined as 0% UCR rate. 50% UCR rate means that the half of the K dots of 100% UCR rate are replaced by C-M-Y dots.

Figure 10A:
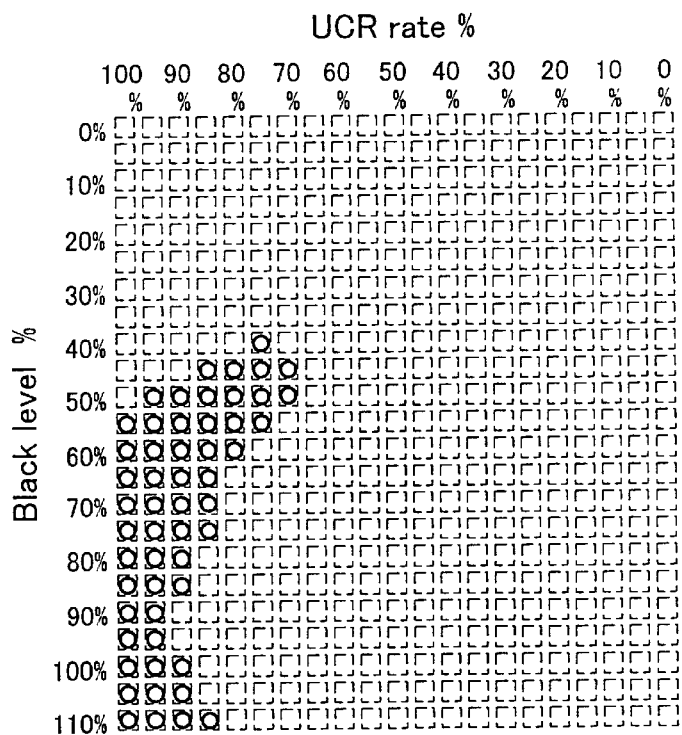
FIG. 10 is an Explanatory figure showing an example of the survey results of the conditions under which bronzing occurs from the patch image printing results.

From among the patch images printed under different conditions, patch images in which bronzing has occurred are selected by sight. FIG. 10(a) is an example of a selection of patch images in which bronzing has occurred under the conditions set by a combination of an ink and a printing paper. The circled patch images in FIG. 10(a) are the patch images in which bronzing is judged to have occurred. Generally, bronzing occurs when black level is high, and UCR rate is also high. Moreover, FIG. 10(a) shows the case in which dye-type ink shown in FIG. 5(a) is used, but similar results can be obtained by using pigment-type ink shown in FIG. 5(b).

Figure 10B:
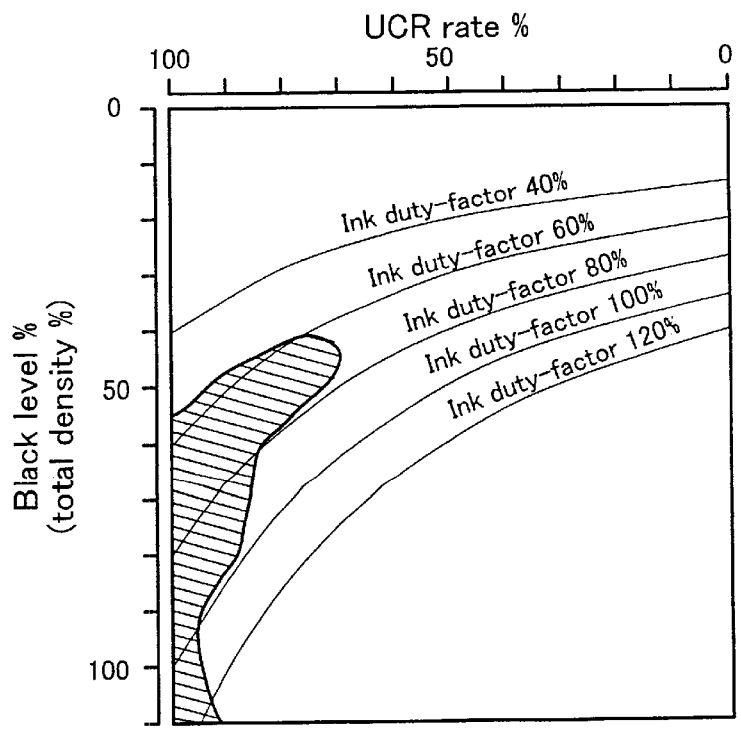

FIG. 10(b) organizes the results in FIG. 10(a). Bronzing occurs under the conditions in which hatching is applied in FIG. 10(b). For example, bronzing occurs if an image with 70% black level is printed only in K ink, but by replacing 20 of the K dots by composite K, it is possible to avoid the occurrence of bronzing. Moreover, the number of dots formed for the unit area increases when 20% of the K dots are replaced by approximately same number of C dots, M dots and Y dots. Therefore, dot recording ratio is 70% before using composite K, while the dot recording ratio of K dots, C dots, M dots, and Y dots increases to the total of approximately 98% as a result of partially using composite K. The ink duty-factor shown in FIG. 10(b) is the total value of the dot recording ratio of the dots in each color. Attention must be paid to keep the ink duty-factor from exceeding the defined value when printing images. That is, if too many ink dots are formed in the same position on the printing paper, the image degrades because the inks mix with each other or the printing paper swells and creases. For this reason, the ink duty tolerance is determined for each printing paper, and it is necessary to print images within the range of this limit. In the color printer 20 in this embodiment, K dots are partially replaced by composite K in order to avoid bronzing; at the same time, care is taken to make sure that the ink duty tolerance does not exceed the limit.

For each combination of ink type and printing paper, a patch image group shown in FIG. 9 is printed and data shown in FIG. 10(b) are accumulated. Changing the conditions that are related to the hues is done as follows. To survey cyan, defined number of cyan dots are formed, and the above-mentioned black level patch image group is printed over these dots. There are various possible settings for the cyan dots formed first. Here, cyan dots with 30% dot recording ratio are formed. The conditions under which bronzing occurs are surveyed for magenta and yellow in the same manner.

Figure 11:
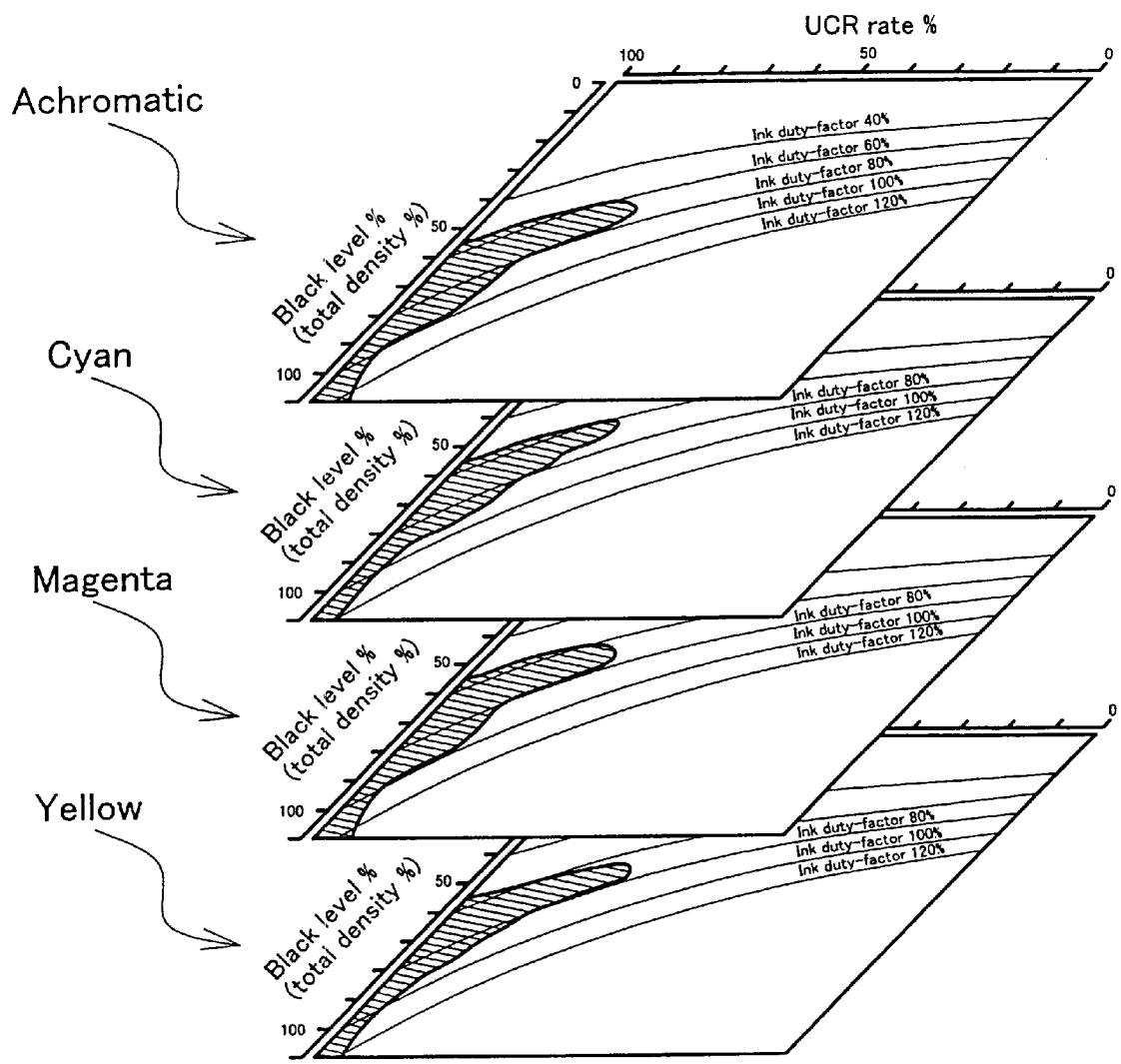
FIG. 11 is an Explanatory figure showing results from varying the hue to survey the conditions under which bronzing occurs.

FIG. 11 shows the survey of the conditions under which bronzing occurs by only changing the hues in this manner. Strictly speaking, the conditions under which bronzing occurs are slightly different according to each hue, but the tendency is the same. Moreover, the conditions under which bronzing occurs seem to be most broad with the achromatic color, and slightly narrower when the hue is changed. This phenomenon can be considered in the following way at the present: In patch images that have the same black level, compared to the achromatic color, K dot ratio is lower in the amount of the dots already formed in the case of chromatic colors, in which K dots are printed over dots such as C dots that are already formed. This results in the same effect as increasing the ratio at which K dots are replaced by composite K. The conditions under which bronzing occurs are thought to be slightly narrower for chromatic colors than the achromatic color for this reason.

Although the cause of the bronzing phenomenon is inadequately understood at present, the inventors have simply studied the occurrence of bronzing under achromatic color conditions only. It has been found in practice that the problem does not occur, even if the same results are obtained for chromatic or achromatic colors. Dot formation for each color is controlled using this knowledge in the color printer 20 of this embodiment, as discussed below.

C-2. Embodiment 1 Which Avoids Bronzing

In the color conversion processing of the print processing routine described above, the printing system of this embodiment converts the R-G-B color image data into C-M-Y-K color tone data (FIG. 8, Step S104). Next, the printing system determines whether or not C-M-Y-K dots for each color are formed based on the tone data converted by means of binary processing (Step S106), and these binary results are used to form dots for each color. At this point, bronzing will occur and print quality will degrade if the forming proportions of these dots for each color are not appropriate. In Embodiment 1 of the printing system, the conditions under which bronzing occurs will be stored ahead of time, and bronzing will be avoided by correcting the color conversion results as follows.

Figure 12:
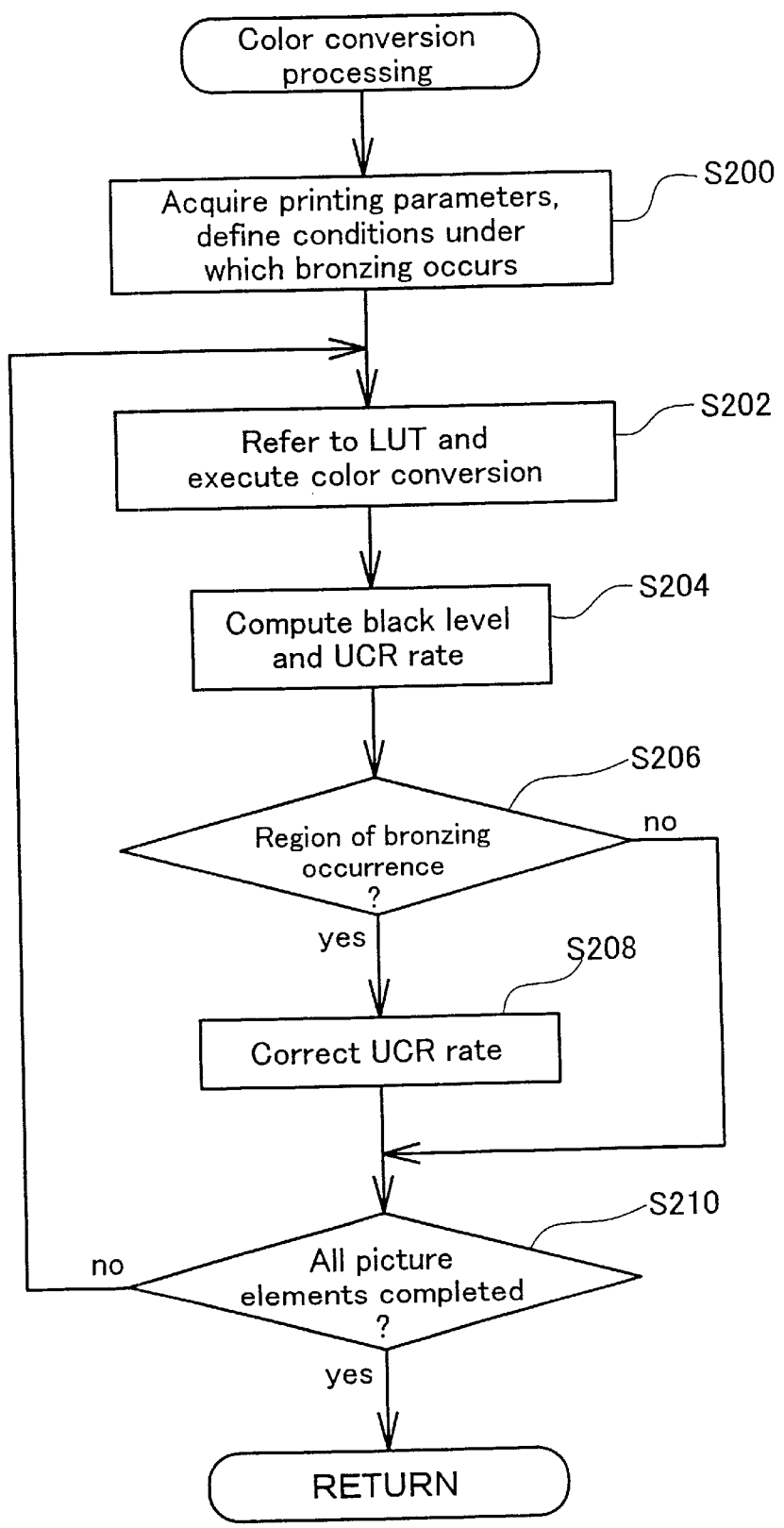
FIG. 12 is a Flowchart illustrating the color conversion processing of Embodiment 1.

FIG. 12 is a flowchart showing the color conversion processing in Embodiment 1. As shown in the flowchart, by starting the color conversion processing in Embodiment 1, printing parameters are acquired first by the CPU 81, and the bronzing occurrence conditions are selected according to the printing parameters thus acquired(Step S200). Therefore, the ranges within which bronzing will occur vary according to the combination of the variety of ink and the printing paper, as discussed above. The variety of ink and the type of printing paper is acquired beforehand, and the definition of the conditions under which bronzing will occur is made according to this information. The acquisition of printing parameters and then the selection of bronzing occurrence parameters will be discussed below.

Printing parameters are acquired on the basis of the settings put in to the printer driver 92 by the user of the color printer 20. The variety of ink is input according to the product number into the printer driver 92 as displayed on the monitor in order to specify the ink. As shown in FIG. 4, the ink product number is printed on the label on the ink cartridge. The types of printing paper are displayed on the computer monitor. The user of the color printer 20 makes his/her selection from these. Based on this selection, the printer driver 92 specifies the printing paper. This information pertaining to the variety of ink and the type of printing paper is stored in the printer driver 92, and is stored there until the user of the color printer 20 makes other selections through the monitor display. This information is first read into the CPU 81 in Step S200.

Next, the conditions under which bronzing occurs are defined according to the printer parameter information which has been read in. FIG. 3 describes the method for establishing the conditions under which bronzing occurs. This method is used to survey beforehand the conditions under which bronzing occurs for each type of ink and printing paper. If the survey results are similar to each other, there are stored as 1 summary result in Embodiment 1. In other words, since a great deal of memory capacity would be required to store all the survey results for each ink and printing paper variety, similar results are summarized as one result.

Figures 13A, 13B:
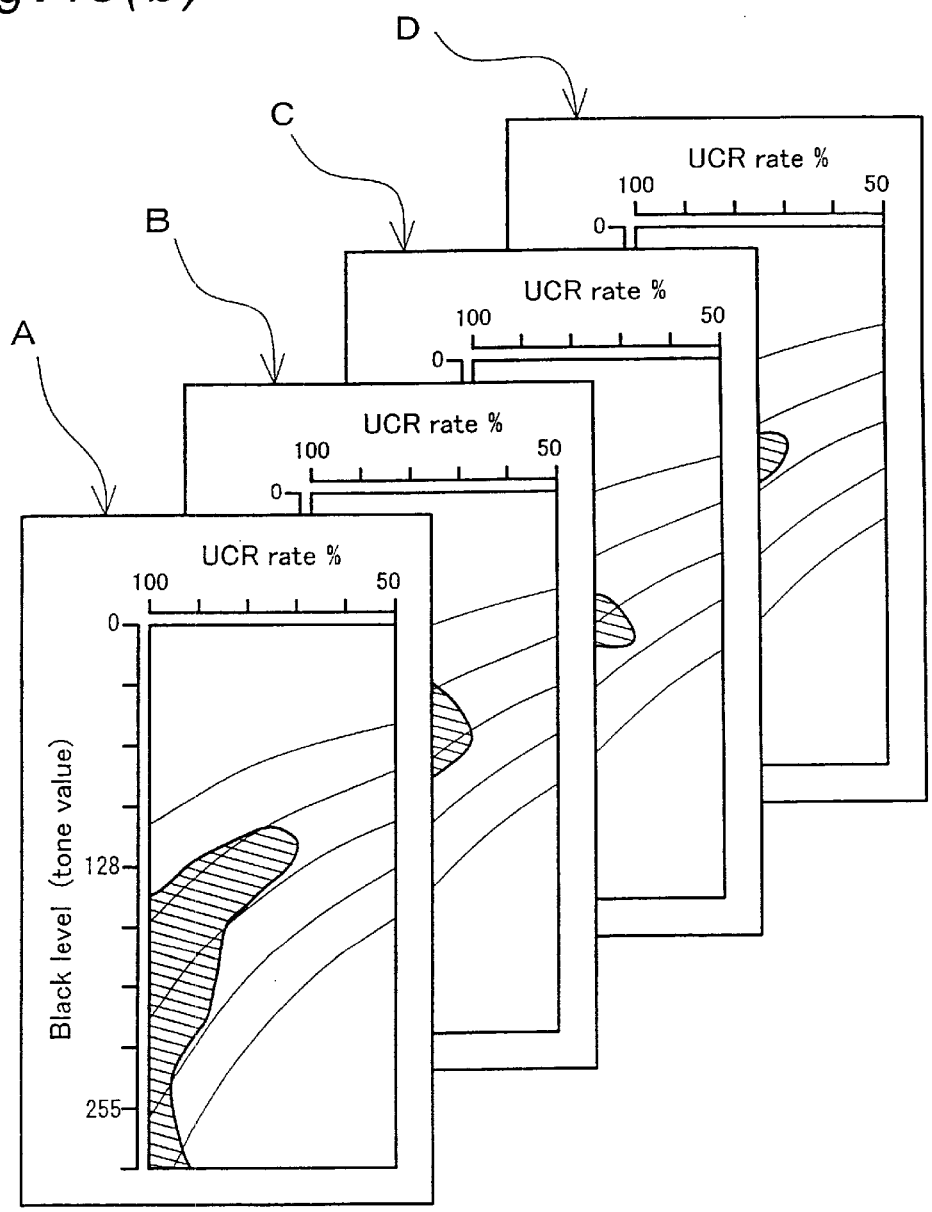
FIG. 13 is an Explanatory drawing showing the elements stored for each of the printing parameters under which bronzing occurs in Embodiment 1.

FIG. 13(a) shows the corresponding relationship between the printing parameters (in other words, the combination of the ink varieties and paper varieties), and the stored survey results. For example, assuming that virtually the same bronzing conditions obtain when paper 1 is used with ink 1, or when paper 1 is used with ink 2, or when paper 2 is used with ink 3, these printing conditions will all be stored as Results A. As shown in FIG. 13(a), these similar survey results can be stored as a summary result for four types of survey results A through D corresponding to 9 printing parameters stored in the computer 80.

Each survey result is stored in the formats shown in FIG. 13(b). Thus, the UCR rate is stored only in the range from 100% to 50%. In this way, memory usage is minimized since bronzing does not occur when the UCR rate is under 50%. Also, the black level is converted and stored according to the tone value. The reason for this is discussed below.

The CPU 81 determines the bronzing occurrence conditions by selecting one of the above-mentioned survey results according to the printing parameter information, shown in FIG. 13(a) which has been read in. This processing is performed in Step S200.

Figure 14:
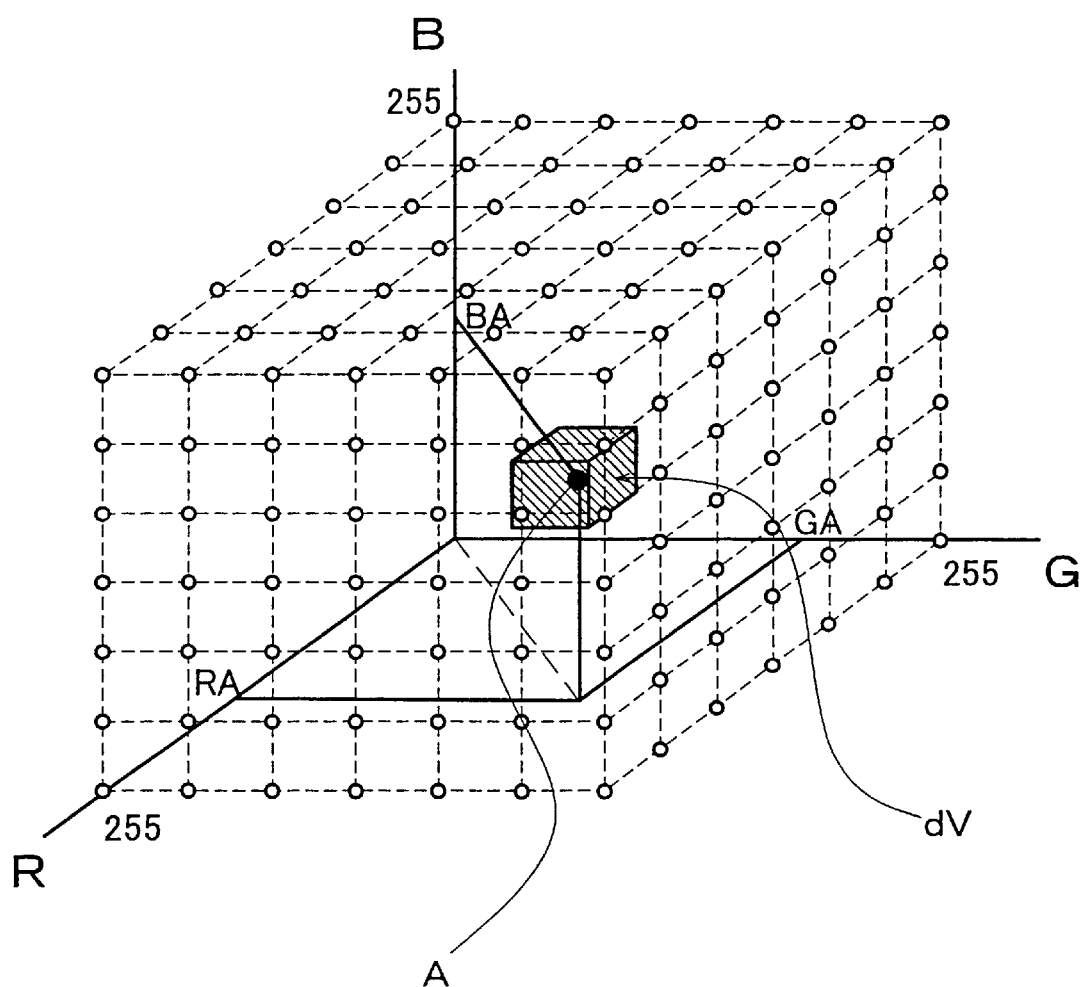
FIG. 14 is an Explanatory drawing showing the color conversion table used in the color conversion processing of Embodiment 1.

Next, the CPU 81 converts the R-G-B color image data into C-M-Y-K color tone data by referring to the color conversion table LUT (Step S202). FIG. 14 shows a schematic diagram of a color conversion table LUT. The R-G-B color tone data intersect orthogonally in three axes, and the spaces formed by the three axes create a grid. If each of the R-G-B coordinates formed at the intersections of this grid is made to correspond to the R-G-B color tone data, then the intersections at each point represent a different color. The C-M-Y-K tone data corresponding to the intersections are stored for each and every intersection coordinate. The color conversion table expresses these three dimensions numerically.

Referring to the color conversion table, the CPU 81 performs color conversion as follows. Given, for example, that the R-G-B tone data of the image data are expressed as RA-GA-BA, then consider point A as expressed by the coordinates (RA, GA, BA) of the color conversion table. A small cube like dV which includes point A is found and the peak intersections of this cube are stored as tone data of C-M-Y-K and are read out. From these read-out tone data, These tone data which have been read out are interpolated and the tone data for C-M-Y-K corresponding to point A are computed.

The CPU 81 computes the black level and the UCR rate upon completion of this color conversion (Step S204). While expressing the color corresponding to each intersection, the color tone data of C-M-Y-K which are stored at the intersections of the color conversion tables also set the UCR rate which enables the production of high-quality images. Thus, if for example a relatively bright color like gray is expressed, there is a tendency for K dots, which tend to stand out, to be sparsely formed, creating a poor image with a rough-looking, rather grainy appearance. Instead of K dots, the picture is enhanced through the use of composite K. On the other hand, when expressing dark colors which are close to black, the image is expressed not with composite K, but with K dots. If composite K is used to express darker colors, the above-mentioned ink duty limit is exceeded, and the image quality degrades. On the other hand, even if K dots are formed in darker colors, the dots will stand out and there will be no degradation in image quality. In this way, the UCR rate is low in the case of comparatively bright colors in order to obtain high-quality images, while the UCR rate is high for comparatively dark colors. However, bronzing may occur when ordinary color conversion is performed. In order to determine whether bronzing will occur or not, the black level and UCR rate for the color conversion results are computed in Step S204.

The black level Brk and UCR rate Rucr are computed according to the following equations:

$$Brk = \min(\alpha 1 \times Cv, \alpha 2 \times Mv, \alpha 3 \times Yv) \times 3 + Kv \qquad (1)$$

$$Rucr = Kv/Brk \qquad (2)$$

Where Cv, Mv, Yv, and Kv represent the C, M, Y, K color tone data found according to the color conversion results from Step S202. When a K-ink expression is converted to a composite-K expression, α1, α2, and α3 are coefficients which represent the ink proportions for the C, M, and Y colors. These coefficients are calculated experimentally beforehand min ( ) is factor which selects the minimum value. For example, the smallest of X, Y, Z will be used in the case of min (X,Y, Z).

Having obtained the black level Brk and the UCR rate Rucr according to these methods, the CPU 81 commences processing to determine whether bronzing will take place or not based on these values (Step S206). In other words, since the conditions under which bronzing will occur have already been determined in Step S200, whether or not bronzing will occur can be determined by using the black level Brk and the UCR rate values which are computed in Step S204.

We will now discuss the reasons why the survey results of the conditions under which bronzing will occur as shown in FIG. 13(b) are stored in a converted form according to the black level tone data. As shown in Equations (1) and (2), the black level Brk and the UCR rate Rucr values after color conversion are found from tone data. Here, in order to simplify the judgment of whether or not bronzing will occur, the survey result black levels are also so converted according to tone data and then stored.

If it is determined in Step S206 that bronzing will occur, the UCR rate will be corrected and bronzing will be avoided (Step S208). Specifically, the UCR rate is corrected as follows.

The maximum value Rlmt of the UCR rate at which bronzing does not occur is found at the calculated black level Brk, and its difference ΔR between the UCR rate Rucr after color conversion is found. Here, since the conditions under which bronzing will occur are found in Step S200 (see FIG. 13), the maximum value Rlmt can be easily found by referring to these survey results. Using the ΔR thus determined, the color tone data for C-M-Y-K are corrected according to the following equations:

$$Kv \rightarrow Kv - \Delta R \qquad (3)$$

$$Cv \rightarrow Cv + \alpha 1 \cdot \Delta R \qquad (4)$$

$$Mc \rightarrow Mv + \alpha 2 \cdot \Delta R \qquad (5)$$

$$Yv \rightarrow Yv + \alpha 3 \cdot \Delta R \qquad (6)$$

where the → symbol indicates substitution. Thus, the symbol in A→B means that B substitutes for A. Moreover, the values for α1, α2, and α3 are found experimentally, and are the coefficients used in Formula (1), above.

If it is determined in the processing done in Step S206 that bronzing will not occur, a judgment is made as to whether or not color conversion processing has been completed for all picture elements (Step S210). If unprocessed picture elements are found remaining, processing is returned to Step S202 and processing is repeated. If no unprocessed picture elements are found, color conversion processing is concluded and processing is returned to the printing processing routine shown in FIG. 8.

When processing is returned to the printing processing routine shown in FIG. 8, binary processing (FIG. 8, Step S106), is performed for the color conversion results obtained above. Thus, the 256 color tone image data for the C, M, Y, and K colors obtained through color conversion processing is converted into binary data which can express whether or not a dot is tom be formed. The image data this obtained is interlaced (FIG. 8, Step S108), and sent to the printer.

In Embodiment 1, binary processing is performed for the corrected color tone data color conversion processing results so that bronzing does not occur. Therefore, the dots are formed at a proportion such that bronzing does not occur for the dots of each color which are judged either.

As described above, Embodiment 1 performs color conversion processing using the existing color conversion tables, and corrects the conditions that cause bronzing to occur. Therefore, by adding data concerning new conditions which cause bronzing to occur, it is easy to obtain high-quality images without bronzing.

In the foregoing discussion, the ink variety and type of printing paper used are read in as printing parameters. However, either the ink variety or the type of printing paper can be read in as printing parameters, and a judgment can be made on this basis as to whether or not bronzing will occur. Also, by limiting the number of parameters which need to be stored in order to determine the occurrence of bronzing, the use of computer storage capacity can be minimized.

C-3. Embodiment 2 Which Avoids Bronzing

In Embodiment 1, the existing color conversion tables are used to perform color conversion, and color conversion results are corrected so that bronzing does not occur. However, there is a method in which the color conversion tables are modified bearing in mind the conditions under which bronzing occurs, and the modified color conversion tables are used to perform color conversion processing (FIG. 8, Step S104). Embodiment 2 is a method which uses the color conversion table which has been set up in consideration of bronzing conditions in this way.

Embodiment 2, uses a modified color conversion table which is set up ahead of time bearing in mind the conditions under which bronzing occurs. As a result, just by executing a normal printing processing routine with the computer 80, high-quality images can be printed by the color printer 20 without the occurrence of bronzing. The conditions under which bronzing occurs are borne in mind in the following discussion about how this color conversion tables are set up.

Figure 15:
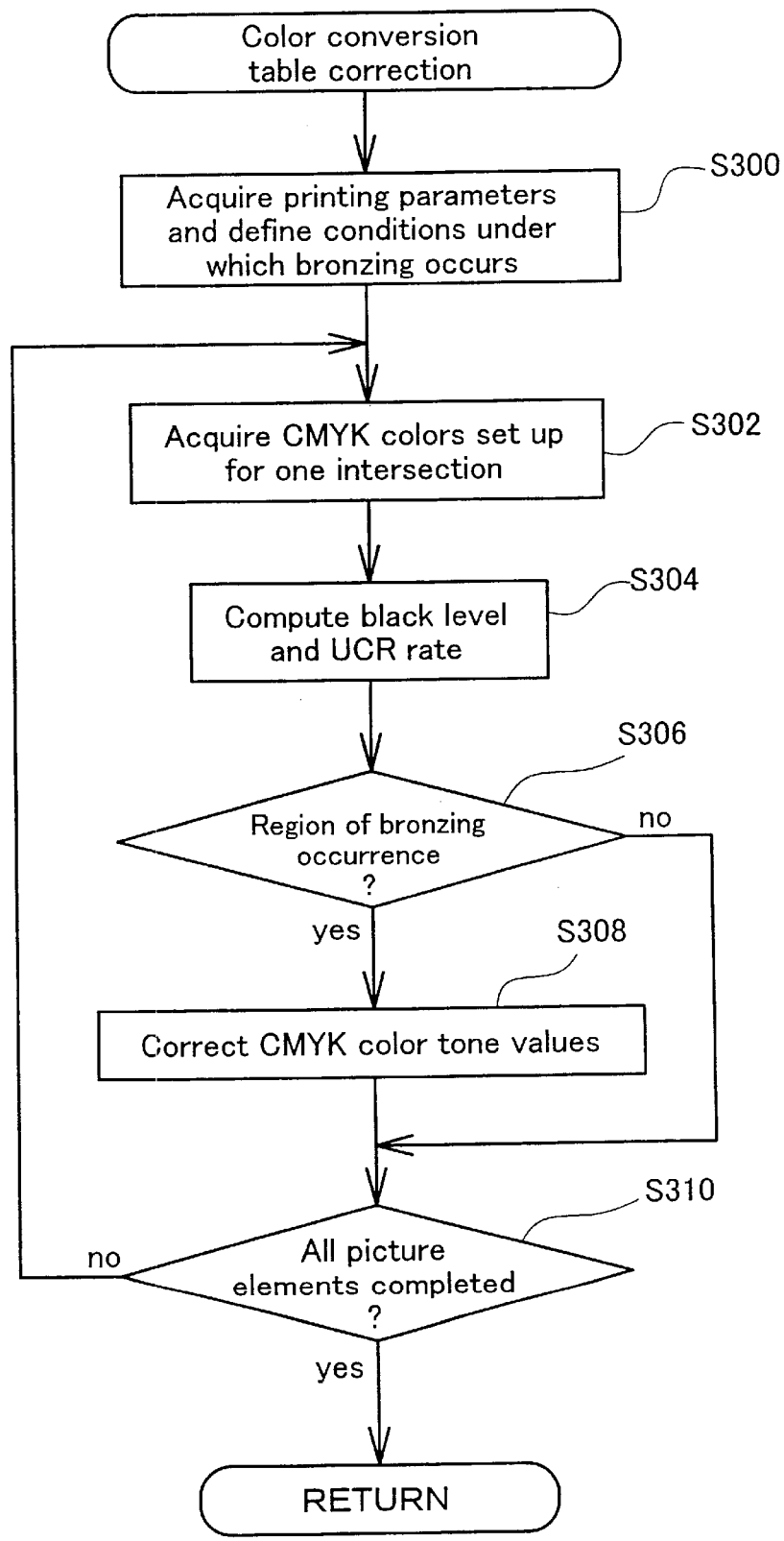
FIG. 15 is a Flowchart illustrating the processing flow for correcting the color conversion tables, bearing in mind the conditions under which bronzing occurs in Embodiment 2.

FIG. 15 is a flowchart describing the processing flow for setting up the color conversion table based on the conditions under which bronzing occurs. This processing is performed by the computer's 80 CPU 81. The CPU 81 corrects the existing color conversion table by performing this processing, and as a result generates a new color conversion table based on an awareness of the conditions under which bronzing occurs for each combination of inks and printing papers. Naturally, it is perfectly acceptable for color printers to be shipped from the factory with corrected color conversion tables.

When color conversion table correction processing is started, first printing parameters are acquired, and then the conditions under which bronzing occurs are defined (Step S300). In other words, since the conditions under which bronzing occurs vary according to the combination of ink and paper varieties, the amount of color conversion table correction will vary according to these various combinations. At this point, a decision is made about whether to correct the color conversion table in light of the anticipated printing parameters. Specifically, the operator of the computer 80 sets up the printing parameters by inputting the ink product number and the type of printing paper by using the screen display, as in Embodiment 1, discussed above.

The conditions under which bronzing occurs are determined on the basis of the printing parameters which have been set up. Thus, the survey results for the conditions under which bronzing occurs are stored ahead of time for each combination of ink and paper varieties, as in Embodiment 1 (See FIG. 13). The corresponding survey results are defined according to the printing parameters which have been set up.

Next, the C-M-Y-K color tone data which has been set up in the LUT intersections of the CPU's 81 color conversion table are read out (Step S302), and the black level and UCR rate are computed for the intersections which are read out (Step S304). Equations (1) and (2) are used for computation, as in Embodiment 1.

Based on the black level Brk and the UCR rate Rucr found in this way, a determination is made as to whether the tone data set up at the grid intersections is appropriate or not. In other words, a judgment is made as whether bronzing conditions are present or not (Step S306). Since the conditions under which bronzing occurs are already defined in Step S300, it is easy to use the combination of the computed black level Brk and the UCR rate Rucr to determine whether or not these are conditions under which bronzing occurs by referring to these conditions.

When it is determined that the conditions under which bronzing occurs are present, the tone data for C-M-Y-K are corrected as follows (Step 308), as in Embodiment 1. First, reference is made to the conditions under which bronzing occurs which have been defined in Step S300, and the maximum value Rlmt at which bronzing does not occur for the computed black level Brk is found. Next, the $\Delta R$ value for the difference between the maximum Rlmt and the computed UCR rate Rucr is found, and the C-M-Y-K color tone data are corrected using equations 3~5, presented above.

If conditions under which bronzing occurs are identified in Step S306 processing, a determination is made as to whether tone data correction has been completed or not for all the intersections of the color conversion table (Step S310), and if unprocessed intersections are found remaining, processing is returned to Step S302 and processing is repeated. In this way, the color correction tables are corrected and stored for each combination of inks and printing papers.

Figure 16:
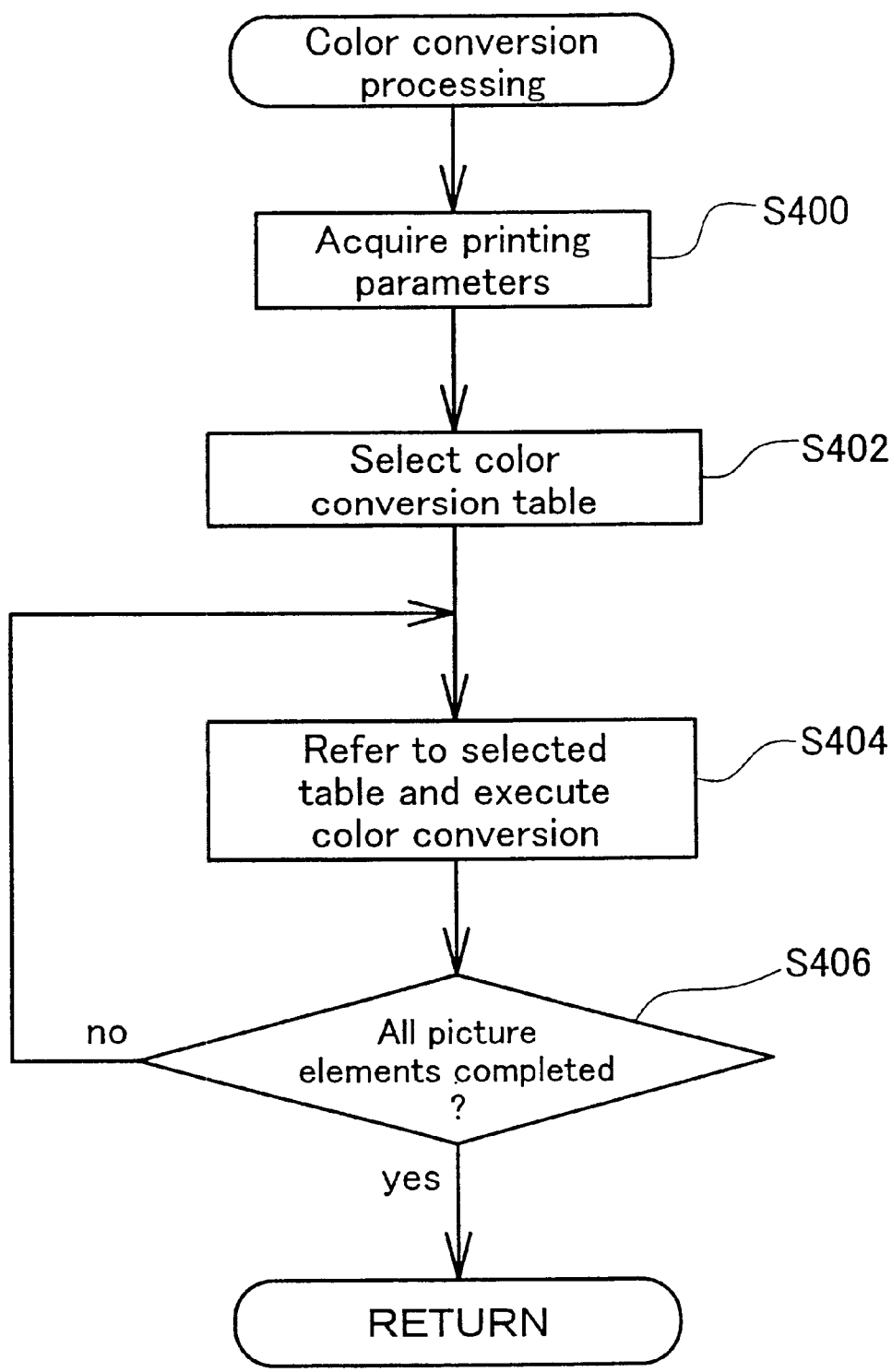
FIG. 16 is a Flowchart illustrating the color conversion processing of Embodiment 2.

FIG. 16 is a flowchart showing the processing flow performed in the color conversion processing in the printing processing routine (FIG. 8, Step S104), when an image is printed with a color printer 20 of Embodiment 2. The flowchart in FIG. 16 presents a simplified explanation of the color conversion processing done by the color printer 20. When color conversion processing is started, the CPU 81 first acquires the printing parameters (type of ink and type of printing paper) (Step S400). These parameters are input beforehand through the display screen of the CRT by the user of the color printer 20, and this information is acquired by the color printer 20.

Next, the color conversion table corresponding to the acquired printing parameters is selected (Step S402). Since the color conversion tables are converted and stored for each printing parameter in the color conversion table correction processing described above, the color conversion table corresponding to the printing parameters is selected from these.

In the explanation of this embodiment, it is assumed that the printer drivers will automatically select the color conversion table which is appropriate for the printing parameters. However, it is acceptable to specify externally the color conversion table appropriate for the printing parameters.

Reference is made to the color conversion table which is selected in this fashion, the RGB image data are converted into CMYK image data (Step S404), and if color conversion is completed for all the picture elements, the system returns to the printing processing routine.

In this way, the color conversion processing of Embodiment 2 uses corrected color conversion tables so that bronzing does not occur for any of the printing parameters. Therefore, high-quality images can ultimately be obtained without bronzing by performing processing such as binary processing for the color conversion results obtained in this way.

As explained above, in Embodiment 2, the color conversion tables are corrected beforehand bearing in mind the conditions under which bronzing occurs. Printing can be done rapidly and without bronzing just by performing normal color conversion processing if these corrected color conversion tables are used for color conversion processing.

In Embodiment 2, described above, although the conditions under which bronzing occurs are considered in terms of each combination of inks and printing papers, to simplify things, either the ink variety or the type of printing paper can be considered. In so doing, processing can be done according to the color conversion table correction processing shown in FIG. 15 and the color conversion processing in FIG. 16. Also, a more economical use of memory capacity can be effected by limiting the number of color conversion tables which need to be stored, which is desirable.

Each embodiment has been present above. However, the embodiments of this invention are not limited to these, and the invention can be implemented in various forms as long as its essential elements are preserved. For example, software programs (application programs), which perform the functions described above can supply and execute these functions through the computer system's main memory or external memory devices by means of telecommunication circuits.

What is claimed is:

1. A print control apparatus for controlling a printing portion by sending control information for controlling the formation of dots of appropriate colors by said printing portion, by which a color image corresponding to image data is printed by combining black ink dots and ink dots in a plurality of primary colors capable in combination of producing achromatic color; said print control apparatus comprising:

a color conversion table storage memory which stores a color conversion table matching the colors of the color image and the combination of each color tone value to form the above hues by using said primary color inks and black ink;

an image data conversion unit which converts said image data to tone data of said primary color inks and black ink, by referring to said stored color conversion table;

a dot formation unit which determines dot formation/non-formation by said primary color inks and black ink, based on said converted tone data; and a control information output unit which sends judgment results of said dot formation/non-formation as said control information for said printing portion;

wherein said color conversion table is a table matching combinations of color tone data of the above primary color inks and said black ink in the case of color shades whose total density of formed dots of each color on said printing media exceeds the defined density when expressed only by using said primary color inks, which combinations of color tone data have been confirmed to be unlikely to cause bronzing during ink dot formation of each color based on each of the above color tone data.

2. The print control apparatus according to claim 1, said print control apparatus further comprising:

an ink type information storage memory which receives and stores information for said primary color ink type and said black ink type used for said dot formation by said printing portion;

wherein said color conversion table storage memory is a memory which stores a plurality of said color conversion table sets by distinguishing the types of said primary color inks and black ink; and said image data conversion unit selects said conversion table corresponding to the inks used by said printing portion based on said stored ink type information, and converts said image data referring to the above color conversion table.

3. The print control apparatus according to claim 1, said print control apparatus further comprising:

a medium type information storage memory which receives and stores information about printing media type on which said printing portion forms each of said color dot;

wherein said color conversion storage memory is a memory which stores a plurality of said color conversion tables set by distinguishing types of said printing media; and said image data conversion unit selects said color conversion table corresponding to printing media used by said printing portion based on said stored media type information, and is a unit which converts said image data by referring to the above selected color conversion table.

4. The print control apparatus according to claim 1, said print control apparatus further comprising:

an ink type information storage memory which receives and stores information for said primary color ink type and said black ink type used by said printing portion for said dot formation;

a media type information storage memory which receives and stores information about printing media type on which said printing portion forms each said color dot;

wherein said color conversion table storage memory is memory which stores a plurality of said color conversion tables set by distinguishing said primary color ink and black ink types and printing media type; and said image data conversion unit selects said color conversion table corresponding to ink and printing media used by said printing portion based on said stored ink type information and medium type information, and is a unit which converts said image data by referring to the above selected color conversion table.

5. The print control apparatus according to claim 1, which sends controlling information for each ink color dot of cyan, magenta, and yellow, as controlling information for controlling dot formation by said primary color inks.

6. The print control apparatus according to claim 5, which further sends controlling information for each ink color dot of light cyan, which is a thin color, and light magenta, which is also a thin color, as controlling information for controlling dot formation by said primary color inks.

7. A print control apparatus for controlling a printing portion by sending control information for controlling the formation of dots of appropriate colors by said printing portion, by which the color image corresponding to the image data is printed by combining black ink dots and ink dots in a plurality of primary colors capable of producing achromatic color by their combination, said print control apparatus comprising:
- a first image data conversion unit which converts said image data into the first tone data which is tone data about each of said primary color inks;
- a second image data conversion unit which converts said first tone data into the second tone data, which is tone data for said primary color inks and black ink, by converting at least a part of the achromatic color expressed in said first tone data, so that the total said primary color ink dot density formed on said printing media does not exceed the defined density when converting the above first tone data into expression format by formation/non-formation of said primary color inks;
- a bronzing occurrence condition storage memory which stores bronzing occurrence conditions, which are a combination of tone data for said primary color inks and black ink, in which bronzing occurs during ink dot formation on said printing media;
- an image data confirmation unit which confirms said second tone data as the third tone data in which bronzing is unlikely to occur, by replacing at least a part of the tone data for the black ink in said second tone data, in case it is determined, based on said stored bronzing occurrence conditions, that bronzing will occur when said primary color inks and black ink dots are formed based on said second tone data;
- a dot formation unit which determines dot formation/non-formation of dots by said primary color inks and black ink based on the above confirmed third tone data; and
- a controlling information output unit which sends said judgment results to said printing portion as said controlling information.

8. The print control apparatus according to claim 7, wherein said bronzing occurrence condition storage memory is a memory which stores said bronzing occurrence conditions, by an index corresponding to tone data about this black ink when the achromatic color in said image data is expressed only by said black ink, and by an index corresponding to the tone data for said black ink at the point where bronzing occurs in this tone data.

9. The print control apparatus according to claim 7, said print control apparatus further comprising:
- a color conversion table storage memory which stores color conversion tables which define each tone data for said primary color inks and black ink capable of expressing each defined multiple color shades without causing bronzing;
- wherein said first image data conversion unit is a unit which carries out the actual processes of said second image data conversion unit, said bronzing occurrence condition storage memory, and said image data confirmation unit, by converting said image data into the tone data for said primary color inks and black ink, by referring to said stored color conversion table.

10. A printing apparatus for printing color images corresponding to image data by combining black ink dots and ink dots in a plurality of primary colors capable of producing achromatic color by the combination; said printing apparatus comprising:
- a color conversion table storage memory which stores color conversion tables which match the shades of color image and combinations of each color tone value for expressing these colors by said primary color inks and black ink;
- an image data conversion unit which converts said image data into tone data for said primary color inks and black ink by referring to said stored color conversion tables;
- a dot formation unit which determines formation/non-formation of dots in said primary color inks and black ink, based on said converted tone data; and
- a dot formation unit which forms dots in each said color inks on printing media, based on the judgment results of said dot formation/non-formation;
- wherein said color conversion tables are tables matching combinations of color tone data of the said primary color inks and said black ink in case of color shades whose total density of formed dots of each color on said printing media exceeds the defined density when expressed only by using said primary color inks, these color tone value combinations having been confirmed to be unlikely to cause bronzing during ink dot formation of each color based on each of the color tone data.

11. A print control method for controlling a printing portion by sending control information for controlling the formation of dots of appropriate colors by said printing portion, by which a color image corresponding to image data is printed by combining black ink dots and ink dots in a plurality of primary colors capable in combination of producing achromatic color, said print control method comprising the steps of:
- converting said image data into tone data for said primary color inks and black ink, by referring to color conversion tables matching the color shades of color image and the combination of each color tone value for expressing this color by said primary color inks and black ink;
- determining dot formation/non-formation in said primary color inks and black ink; and
- sending said dot formation/non-formation judgment results to said printing portion as said control information,
- wherein said color conversion table is a stored table matching combinations of color tone data of said primary color inks and said black ink in case of color shades whose total density of formed dots of each color on said printing media exceeds the defined density when expressed only by using said primary color inks, these combinations of color tone data having been confirmed to be unlikely to cause bronzing during ink dot formation of each color based on each said color tone value.

12. The print control method according claim 11, said print control method further comprising the steps of:
- storing a plurality of said color conversion tables set up by distinguishing said printing media as said color conversion tables;
- receiving information about printing media type on which said printing portion forms each said color dot, and selecting said color conversion tables from among said stored color conversion tables; and
- converting said image data into said tone data by referring to said selected color conversion table.

13. A print method for printing color images corresponding to image data by combining black ink dots and ink dots in a plurality of primary colors capable of producing achromatic color by a combination, said print method comprising the steps of:

converting said image data into tone data for said primary color inks and black ink, by referring to color conversion tables matching the color shades of color image and combination of each color tone value expressing said shade by using said primary color inks and black ink;

determining dot formation/non-formation in said primary color inks and black ink, based on said converted tone data; and forming dots in each said color ink on said printing media based on said dot formation/non-formation judgment results, wherein said color conversion tables are stored tables matching combinations of color tone data of said primary color inks and said black ink in case of color shades whose total density of formed dots of each color on said printing media exceeds the defined density when expressed only by using said primary color inks, these combinations of color tone data having been confirmed to be unlikely to cause bronzing during ink dot formation of each color based on each said color tone value.

14. A recording medium for recording methods for controlling said printing portion by sending control information for controlling the formation of dots of appropriate colors by the printing portion by which the color image corresponding to the image data is printed, by combining black ink dots and ink dots in a plurality of primary colors capable in combination of producing achromatic color in computer-readable format storing programs for realizing:

a function for storing color conversion table matching color shades of color image and combinations of each color tone value for expressing said color shade in said primary color inks and black ink;

a function for converting said image data into tone data for said primary color inks and black ink, by referring to said stored color conversion tables;

a function for determining dot formation/non-formation in said primary color inks and black ink, based on said converted tone data; and a function for sending said dot formation/non-formation judgment results to said printing portion as said controlling information; and wherein said color conversion table of the recording medium is a table matching combinations of color tone data of said primary color inks and said black ink in case of color shades whose total density of formed dots of each color on said printing media exceeds the defined density when expressed only by using said primary color inks, these combinations of color tone data having been confirmed to be unlikely to cause bronzing during ink dot formation of each color based on each said color tone value.

15. A method for setting up color conversion tables which stores said color shades of color image matched to said each color tone data, which is used in case of converting image data of color image into each color tone data for black and primary colors capable of expressing the achromatic color by the combination, said method comprising the steps of:

matching each color shade expressed in said image data and primary color tone data which is a combination of tone data of said primary colors to express said colors;

determining whether the total density of dots of each color formed on said printing media exceeds the defined density when expressing said color shade by forming dots in said primary colors based on said primary color tone data; and if said total density exceeds the defined density, converting at least a part of the tone value corresponding to the achromatic color in said basic tone data to said black tone value equaling the value, within the combination of tone data of said primary colors and black confirmed to be unlikely to cause bronzing in formation of each color dots on said printing media.

16. The method for setting up color conversion tables according to claim 15, wherein the domain of combinations of tone data of each said color ink confirmed to be unlikely to cause said bronzing is the domain set by tone value of said black ink when expressing tone data corresponding to the achromatic color in said basic tone data only by said black ink, and the tone value of said black ink at which value bronzing occurs if said achromatic color area is converted.

\* \* \* \* \*

UNITED STATES PATENT AND TRADEMARK OFFICE
CERTIFICATE OF CORRECTION

PATENT NO.     : 6,341,833 B1
DATED          : January 29, 2002
INVENTOR(S)    : Liu et al.

It is certified that error appears in the above-identified patent and that said Letters Patent is hereby corrected as shown below:

<u>Title page,</u>
Item [30], the Foreign Application Priority information should read:

-- [30]      Foreign Application Priority Data
       Sep. 2, 1999   (JP) ............................... 11-248459
       Jul. 17, 2000  (JP) ............................... 2000-215583 --

Signed and Sealed this

Third Day of September, 2002

Attest:

Attesting Officer

JAMES E. ROGAN
*Director of the United States Patent and Trademark Office*